United States Patent
Xu et al.

(10) Patent No.: US 12,169,940 B2
(45) Date of Patent: Dec. 17, 2024

(54) METHODS AND APPARATUS FOR MOTION DETECTION

(71) Applicant: SimpliSafe, Inc., Boston, MA (US)

(72) Inventors: Monica Xu, Cambridge, MA (US); Shekhar Bangalore Sastry, Arlington, MA (US); Nicholas Setzer, Boston, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 18/423,726

(22) Filed: Jan. 26, 2024

(65) Prior Publication Data
US 2024/0257360 A1    Aug. 1, 2024

Related U.S. Application Data

(60) Provisional application No. 63/482,236, filed on Jan. 30, 2023.

(51) Int. Cl.
*G06T 7/246*    (2017.01)
*G01J 5/00*    (2022.01)
(Continued)

(52) U.S. Cl.
CPC ............ *G06T 7/248* (2017.01); *G01J 5/0025* (2013.01); *G06T 7/11* (2017.01); *G06T 7/136* (2017.01);
(Continued)

(58) Field of Classification Search
CPC . G06T 7/248; G06T 7/11; G06T 7/136; G06T 7/187; G06T 7/215; G06T 7/254;
(Continued)

(56) References Cited

U.S. PATENT DOCUMENTS 6,580,812 B1    6/2003    Harrington
7,474,767 B2    1/2009    Sen et al.
(Continued)

FOREIGN PATENT DOCUMENTS

WO    2010084902 A1    7/2010
WO    2024155336 A1    7/2024

OTHER PUBLICATIONS

Suman Tewary et al, Hybrid multi-resolution detection of moving targets in infrared imagery, Infrared Physics & Technology, Jul. 22, 2014, 173-183, 67.

(Continued)

*Primary Examiner* — Mia M Thomas
(74) *Attorney, Agent, or Firm* — Finch & Maloney PLLC

(57) ABSTRACT

In one example, a method of motion detection includes producing a first image based on a plurality of previous images, the first image including pixels having intensity values that approximate a difference in intensity values between a pair of pixels within the previous images, and the pair of pixels being one pixel from each of first and second previous images and present at the same locations within their respective images, generating a second image by applying a threshold to the first image, the second image including one or more pixels with intensity values above the threshold, the threshold being derived from intensity values of pixels within the first image and a number of pixels in the first image with a respective intensity value, and determining a region of the second image indicating motion based on a location of the one or more pixels in the second image.

21 Claims, 23 Drawing Sheets

(51) Int. Cl.
 *G06T 7/11* (2017.01)
 *G06T 7/136* (2017.01)
 *G06T 7/187* (2017.01)
 *G06T 7/215* (2017.01)
 *G06T 7/254* (2017.01)

(52) U.S. Cl.
 CPC .............. *G06T 7/187* (2017.01); *G06T 7/215* (2017.01); *G06T 7/254* (2017.01); *G06T 2207/10016* (2013.01); *G06T 2207/30232* (2013.01)

(58) Field of Classification Search
 CPC . G06T 2207/10016; G06T 2207/30232; G01J 5/0025
 See application file for complete search history.

(56) References Cited

U.S. PATENT DOCUMENTS

| | | | |
|---|---|---|---|
| 8,189,049 | B2 | 5/2012 | Lopota et al. |
| 9,521,606 | B1* | 12/2016 | Costa ................... H04L 63/083 |
| 9,906,722 | B1 | 2/2018 | Gigot |
| 10,333,923 | B2* | 6/2019 | Johri ...................... G06F 21/36 |
| 10,402,643 | B2 | 9/2019 | James et al. |
| 10,504,240 | B1 | 12/2019 | Solh ........................ H04N 23/73 |
| 11,004,209 | B2* | 5/2021 | Chen ...................... G06V 10/82 |
| 11,217,076 | B1* | 1/2022 | Siminoff ................ H04N 7/181 |
| 11,257,226 | B1 | 2/2022 | Solh et al. |
| 11,288,551 | B2 | 3/2022 | Desai et al. |
| 11,336,869 | B2 | 5/2022 | Yao et al. |
| 11,803,973 | B1* | 10/2023 | Xu ...................... G08B 13/1961 |
| 11,922,642 | B1* | 3/2024 | Setzer .................... H04N 7/188 |
| 11,922,669 | B1* | 3/2024 | Sastry .................... G06V 10/25 |
| 2005/0198600 | A1* | 9/2005 | Hasegawa ............. G06F 30/398 716/112 |
| 2012/0314901 | A1 | 12/2012 | Hanson et al. |
| 2013/0293460 | A1 | 11/2013 | Kaplan et al. |
| 2016/0026890 | A1 | 1/2016 | Gupta et al. |
| 2016/0042621 | A1* | 2/2016 | Hogg ...................... H04N 23/64 348/155 |
| 2016/0352722 | A1* | 12/2016 | Johri .................. G06Q 30/0238 |
| 2017/0109613 | A1 | 4/2017 | Kolavennu et al. |
| 2018/0285650 | A1* | 10/2018 | George .................. G06V 20/52 |
| 2018/0288397 | A1* | 10/2018 | Lee ....................... H04N 13/204 |
| 2019/0087646 | A1* | 3/2019 | Goulden ................... G06T 7/70 |
| 2019/0311201 | A1 | 10/2019 | Selinger et al. |
| 2019/0318171 | A1 | 10/2019 | Wang et al. |
| 2020/0342748 | A1* | 10/2020 | Tournier ................ G08B 13/19 |
| 2021/0089841 | A1 | 3/2021 | Mithun et al. |
| 2021/0158048 | A1* | 5/2021 | Lee ......................... G06F 18/22 |
| 2021/0329193 | A1 | 10/2021 | Wu et al. |
| 2021/0365707 | A1 | 11/2021 | Mao et al. |
| 2021/0390696 | A1 | 12/2021 | Iwase et al. |
| 2022/0201320 | A1 | 6/2022 | Karunaratne et al. |
| 2022/0222477 | A1 | 7/2022 | Shen et al. |
| 2023/0014948 | A1 | 1/2023 | Guan |
| 2023/0156323 | A1 | 5/2023 | Hanzawa |
| 2023/0306712 | A1 | 9/2023 | Lee et al. |
| 2024/0031663 | A1* | 1/2024 | Morgan ................. G08B 25/14 |
| 2024/0249420 | A1* | 7/2024 | Xu ........................... G06T 7/215 |
| 2024/0257521 | A1 | 8/2024 | Sastry et al. |

OTHER PUBLICATIONS

Gustavo H.F. De Carvalho et al., Anomaly detection with a moving camera using multiscale video analysis, Multidim Syst Sign Process, (2019), 311-342, 30.

Nazir Sajid et al., "Person Detection with Deep Learning and IoT for Smart Home Security on Amazon Cloud", 2021 International Conference on Electrical, Computer, Communications and Mechatronics Engineering (ICECCME), IEEE, Oct. 7, 2021, pp. 1-6.

Shahid Aasma et al., "Computer vision based intruder detection framework (CV-IDF)", 2017 2nd International Conference on Computer and Communication Systems (ICCCS), IEEE, Jul. 11, 2017, pp. 41-45.

F. C. Akyon et al. "Slicing Aided Hyper Inference and Fine-Tuning for Small Object Detection," 2022 IEEE International Conference on Image Processing (ICIP), Bordeaux, France, Oct. 16-19, 2022, pp. 966-970.

Ren et al., "Faster R-CNN: Towards Real-Time Object Detection with Region Proposal Networks", IEEE Transactions on Pattern Analysis And Machine Intelligence, vol. 39, No. 6, Jun. 6, 2017.

Wang et al., "Improved Object Detection Algorithim Based on Faster RCNN", Journal of Physics: Conference Series, 2022.

Agrawal et al., "An improved Gaussian Mixture Method based Background Subtraction Model for Moving Object Detection in Outdoor Scene", IEEE Fourth International Conference on Electrical, Computer and Communication Technologies (ICECCT), 2021.

International Search Report and Written Opinion received for PCT Application No. PCT/US2024/013077, dated Jun. 5, 2024. 12 pages.

Zhang et al., "Moving Objective Detection and Its Contours Extraction Using Level Set Method", IEEE International Conference on Control Engineering and Communication Technology, 2012, pp. 778-781.

* cited by examiner

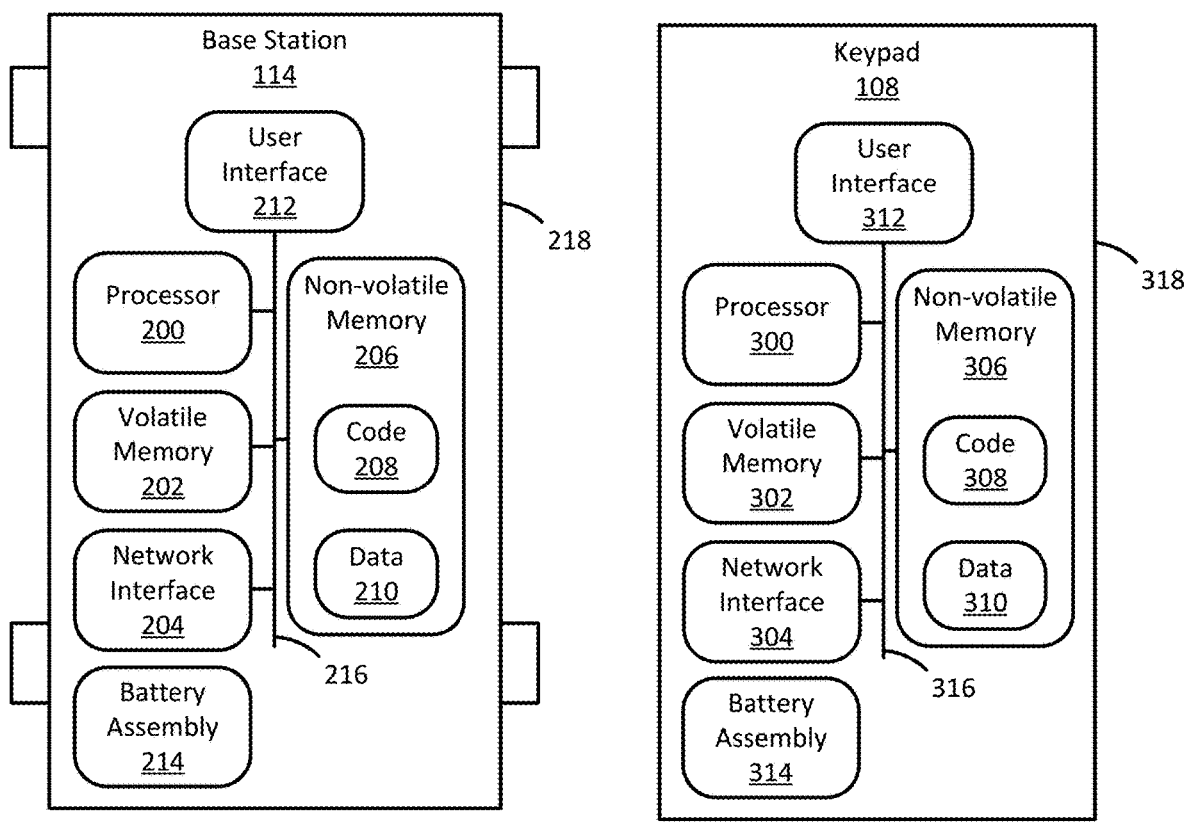

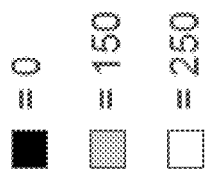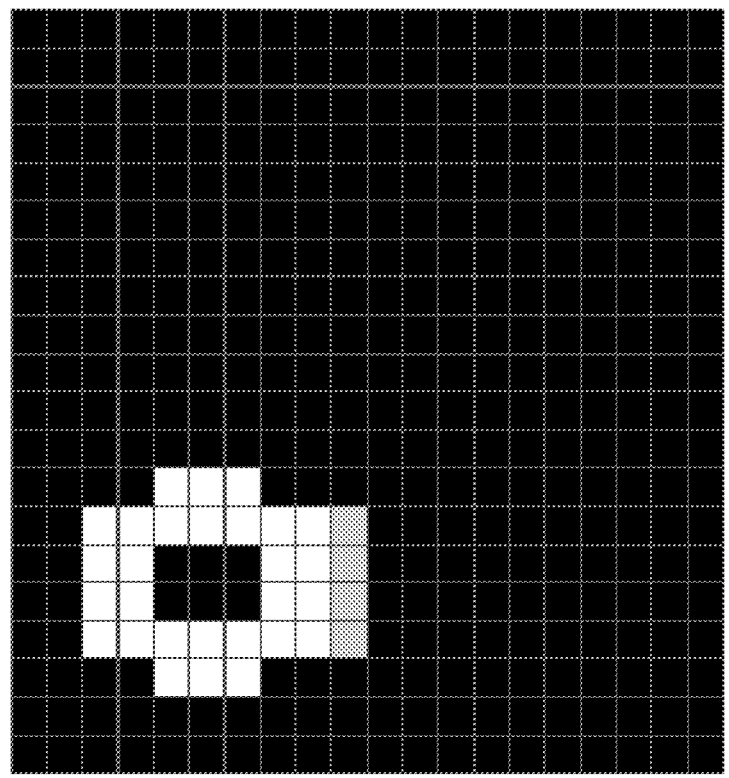
FIG. 11

METHODS AND APPARATUS FOR MOTION DETECTION

CROSS-REFERENCE TO RELATED APPLICATIONS

This application claims priority under 35 U.S.C. § 119(e) to U.S. Provisional Application No. 63/482,236 filed on Jan. 30, 2023 and titled "METHODS AND APPARATUS FOR MOTION DETECTION," which is hereby incorporated herein by reference in its entirety for all purposes.

TECHNICAL FIELD

Aspects of the technologies described herein relate to security systems and methods, more particularly, to motion-sensitive cameras and systems and methods utilizing the same.

BACKGROUND

Some monitoring systems use one or more cameras to capture images of areas around or within a residence or business location. Such monitoring systems can process images locally and transmit the captured images to a remote service. If motion is detected, the monitoring systems can send an alert to one or more user devices.

SUMMARY

Aspects and examples are directed to techniques for improving accuracy of threat detection based on detected motion, and to security devices and systems implementing the same.

According to one example, a method comprising producing a first image based on a plurality of previous images that form part of a sequence of images, the first image including pixels with intensity values that approximate a difference in intensity values between a pair of pixels within the previous images, and the pair of pixels being one pixel from each of first and second previous images and present at the same locations within their respective images, generating a second image by applying a threshold to the first image, the second image including one or more pixels with intensity values above the threshold, and the threshold being derived from intensity values of pixels within the first image and a number of pixels in the first image with a respective intensity value, and determining a region of the second image indicative of motion based on a location of the one or more pixels in the second image.

Examples of the method may include any one or more of the following features.

The method may further comprise acquiring the plurality of previous images using a camera. In examples, the method further comprises detecting a motion event in a scene using a motion detector, and based on detecting the motion event, activating the camera to acquire the plurality of images.

The method may further comprise determining the first threshold by assembling a data set corresponding to the first image, the data set specifying the intensity values of pixels within the first image and the number of pixels in the first image with the respective intensity value, calculating a mean of the data set and a standard deviation for the data set, and determining the first threshold based on the mean and the standard deviation.

According to another example, a method of motion detection comprising acquiring first and second images of a scene using an image capture device, producing a third image based on the first and second images, wherein a first intensity value of individual pixels in the third image corresponds to a magnitude of a difference in intensity between respective corresponding pixels in the first and second images, determining a first threshold based on the third image, applying the first threshold to the third image to produce a fourth image, wherein each pixel in the fourth image has a respective second intensity value, and wherein the second intensity value is determined based on whether or not the first intensity value of a corresponding pixel in the difference image exceeds the first threshold, grouping pixels of the fourth image into a plurality of blocks, individual blocks including a plurality of the pixels of the filtered image, summing the second intensity values of the plurality of pixels in individual blocks to produce a summed value for the respective block, and identifying a region of motion in the second image based on two or more adjacent blocks in the fourth image having summed values that exceed a second threshold.

The method may include any one or more of the following features.

In one example, identifying the region of motion in the second image comprises producing a bounding box corresponding to the two or more adjacent blocks, and overlaying the at least one bounding box on the second image. In another example, producing the bounding box comprises forming a connected region in the fourth image, the connected region including the two or more adjacent blocks, and producing the bounding box based at least in part on an outline of the connected region.

In one example, determining the first threshold comprises assembling a data set corresponding to the difference image, calculating a mean of the data set and a standard deviation for the data set, and determining the first threshold based on the mean and the standard deviation. In another example, determining the first threshold includes determining the first threshold based on a sum of the mean multiplied by a first constant and the standard deviation multiplied by a second constant, wherein the first and second constants are empirically determined constants.

In one example, the second intensity value of each pixel in the fourth image is one of zero based on the first intensity value of the corresponding pixel in the third image being at or below the first threshold, or the first intensity value of the corresponding pixel in the third image based on the first intensity value of the corresponding pixel in the third image exceeding the first threshold.

In one example, the method further comprises detecting a motion event in a scene using a motion detector, and based on detecting the motion event, activating the image capture device to acquire the first and second images.

The method may further comprise, prior to producing the third image, converting the first and second images to first and second greyscale images, respectively, wherein producing the third image includes producing the third image based on the first and second greyscale images.

Another example is directed to a method of motion detection comprising acquiring first and second images of a scene using an image capture device, producing a difference image based on the first and second images, the difference image comprising a first plurality of pixels, wherein individual first intensity values of respective pixels of the first plurality of pixels in the difference image correspond to a magnitude of a difference in intensity between respective corresponding pixels in the first and second images, determining a first threshold based on the difference image, filtering the difference image by applying the first threshold to produce a filtered image having a second plurality of pixels, wherein individual second intensity values of respective pixels of the second plurality of pixels in the filtered image are determined based on whether or not the first intensity value of a corresponding pixel in the third image exceeds the first threshold, dividing the filtered image into a plurality of blocks, individual blocks including a subset of pixels of the plurality of pixels of the filtered image, summing the second intensity values of the subset of pixels in individual blocks to produce a summed value for the respective block, and identifying a region of motion in the second image based on two or more adjacent blocks in the filtered image having summed values that exceed a second threshold.

Examples of the method may include any one or more of the following features.

In one example, determining the first threshold comprises assembling a data set corresponding to the difference image, the data set identifying the first intensity values and a number of pixels in the third difference image having each first intensity value, calculating a mean of the data set and a standard deviation for the data set, and determining the first threshold based on the mean and the standard deviation.

In another example, the respective second intensity values of the second plurality of pixels in the filtered image are one of zero, or the first intensity value of the corresponding pixel in the difference image based on the first intensity value exceeding the first threshold.

According to another example, a security sensor comprising an image capture device, at least one processor, and a data storage device storing instructions that when executed by the at least one processor cause the security sensor to acquire first and second image frames using the image capture device, determine differences in pixel intensities between the first and second images, based on the differences, produce a third image, wherein a first intensity value of individual pixels in the third image corresponds to a magnitude of a difference in intensity between respective corresponding pixels in the first and second images, determine a first threshold based on the third image, produce a fourth image based on the first threshold, wherein each pixel in the fourth image has a respective second intensity value determined based on whether or not the first intensity value of a corresponding pixel in the third image exceeds the first threshold, divide the fourth image into a plurality of blocks, individual blocks including a respective subset of pixels of the fourth image, sum the second intensity values of the respective subset of pixels in individual blocks to produce a corresponding plurality of summed values, and identify a region of motion in the second image based on two or more adjacent blocks in the third image having summed values that exceed a second threshold.

In one example, to identify the region of motion, the data storage device further stores instructions that when executed by the at least one processor cause the security sensor to produce a bounding box corresponding to the two or more adjacent blocks, and overlay the at least one bounding box on the second image. In another example, to determine the first threshold, the data storage device further stores instructions that when executed by the at least one processor cause the security sensor to assemble a data set corresponding to the third image, the data set identifying the first intensity values and a number of pixels in the third image having each first intensity value, calculate a mean of the data set and a standard deviation for the data set, and determine the first threshold based on the mean and the standard deviation. In another example, the data storage device further stores instructions that when executed by the at least one processor cause the security sensor to determine the first threshold based on a sum of the mean multiplied by a first constant and the standard deviation multiplied by a second constant, wherein the first and second constants are empirically determined constants.

In one example, the second intensity value of each pixel in the fourth image is one of zero based on the first intensity value of the corresponding pixel in the third image being at or below the first threshold, or the first intensity value of the corresponding pixel in the third image based on the first intensity value of the corresponding pixel in the third image exceeding the first threshold.

In one example, the second threshold is higher than the first threshold.

In another example, the security sensor further comprises a motion detector configured to detect a motion event in the scene. In one example, the motion detector is a passive infrared sensor. In another example, the data storage device further stores instructions that when executed by the at least one processor cause the security sensor to, based on detection of the motion event with the motion detector, activate the image capture device to acquire the first and second images. The security sensor may further comprise a battery coupled to the motion detector, the image capture device, the data storage device, and the at least one processor.

Still other aspects, examples, and advantages of these exemplary aspects and examples are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this disclosure. However, the figures are not intended as a definition of the limits of any particular example. The figures, together with the remainder of this disclosure, serve to explain principles and operations of the described and claimed aspects. In the figures, the same or similar components that are illustrated are represented by a like reference numeral. For purposes of clarity, every component may not be labeled in every figure. In the figures:

FIG. 2 is a schematic diagram of a base station, according to some examples described herein;

FIG. 3 is a schematic diagram of a keypad, according to some examples described herein;

FIG. 11 is a diagram illustrating an example of a difference image obtained by comparing intensities of corresponding pixels of the images of FIGS. 9A and 9B according to some examples described herein;

FIG. 17A is a diagram showing an example of a summed grid corresponding the filtered image of FIG. 15 according to some examples described herein;

FIG. 17B is a diagram showing an example of a connected region identified in the summed grid of FIG. 17A according to some examples described herein;

DETAILED DESCRIPTION

Figure 1:
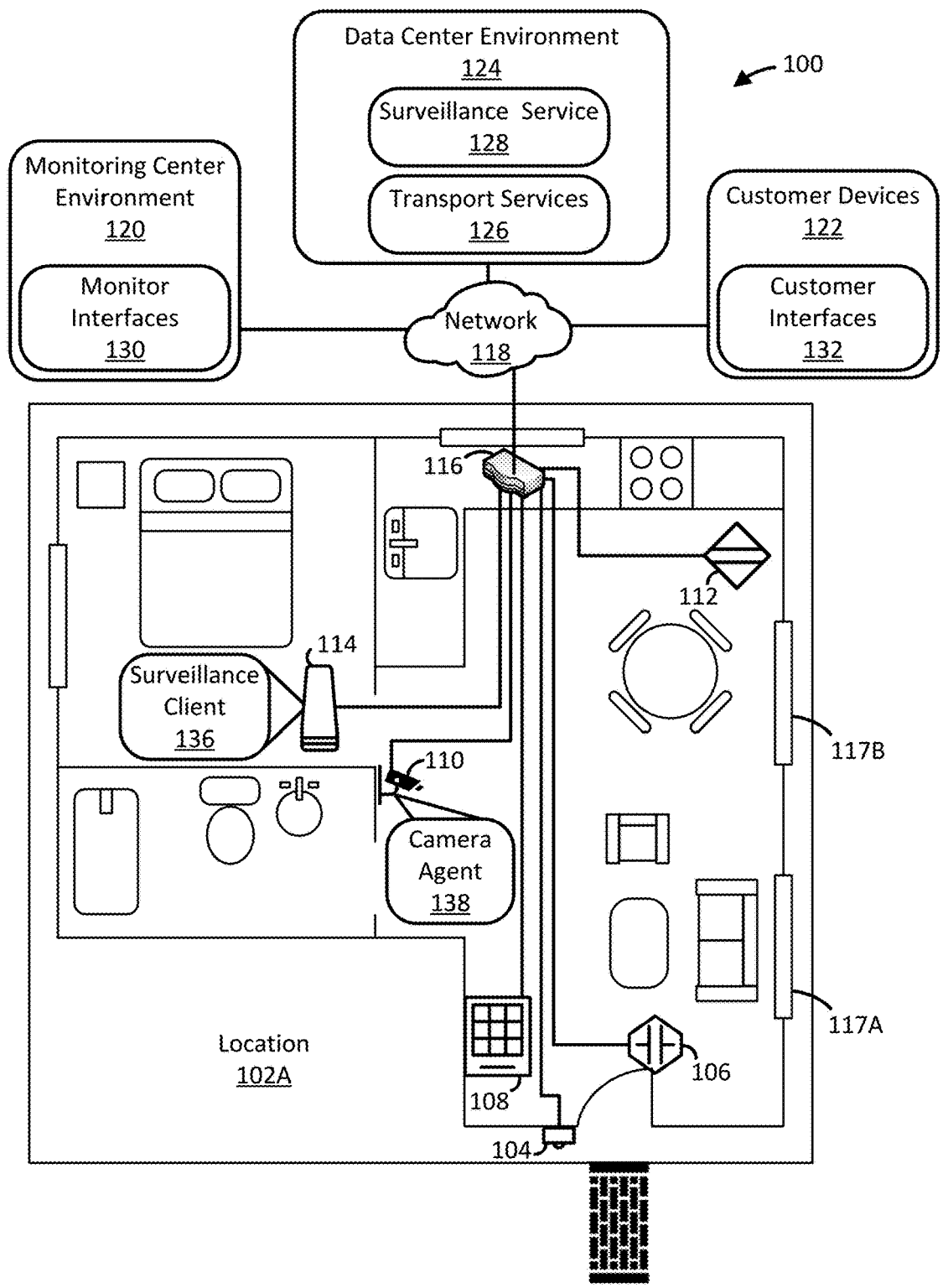
FIG. 1 is a schematic diagram of a security system, according to some examples described herein.

Security systems can include a range of sensors configured to detect various events or conditions, such as motion, moisture, temperature changes, and sounds, among others. For example, imaging sensors can include a camera that captures still and/or video images of a scene within a field of view of the camera. The field of view of the camera corresponds to the extent of the observable world that is "seen" at any given moment by the image capture device, which is generally the solid angle through which the camera is sensitive to electromagnetic radiation.

When a camera is activated to begin capturing images of a scene, the camera undergoes a period of automatic exposure adjustments before being able to acquire a well-exposed image. During this period of adjustment, the images from the camera can vary significantly in brightness. Due to this variance in brightness, the images are not useful for motion detection because pixel intensity changes caused by moving objects are not distinguishable from those caused by the camera's automatic exposure adjustments or other lighting changes. As a result, a sensor may produce false positive alerts during the adjustment period of the camera. High numbers of false positive alarms are undesirable for several reasons. For example, receiving many false positive alarms can be annoying and distracting for an owner of the security system. In addition, it can cause the security system to use more power because a high rate of alarms causes the electronics of the system, including those that consume relatively high power, such as processors and transmitters, for example, to be active more of the time. This is undesirable in general for environmental and energy-efficiency reasons, and can be even more problematic for battery-powered security sensors where unnecessary activity can shorten the battery life. Alternatively, motion detection processes can be delayed until the camera has achieved a well-exposed image, but this delay results in a period of time during which an important event may go undetected.

To address these and other issues, aspects and examples are directed to techniques for improving security sensors by providing reliable threat detection while also decreasing power consumption to save energy and/or extend battery time. In particular, aspects and examples provide techniques for reducing false positive events that can occur during the automatic adjustment period of a camera upon start-up without introducing an undesirable delay in processing, thereby improving reliability of threat detection, as discussed further below.

Examples of the techniques disclosed herein can be implemented using a sensor (e.g., battery-powered imaging security sensor) including a motion detector configured to detect moving objects, an image capture device (e.g., a camera), a battery, at least one processor, and a data storage device. The data storage device stores instructions that when executed by the at least one processor cause the image capture device to acquire first and second image frames using an image capture device, determine differences in pixel intensities between the first and second images, based on the differences, produce a difference image, wherein a first intensity value of individual pixels in the difference image corresponds to a magnitude of a difference in intensity between respective corresponding pixels in the first and second images, determine a first threshold value based on the difference image, produce a filtered image based on the first threshold value, wherein individual pixels in the filtered image has a second intensity value, and wherein the second intensity value is determined based on whether or not the first intensity value of a corresponding pixel in the difference image exceeds the first threshold value, group pixels of the filtered image into a plurality of blocks, individual blocks including a plurality of the pixels of the filtered image, sum the second intensity values of the plurality of pixels in individual blocks to produce a summed value for individual blocks, and identify a region of motion in the second image based on two or more adjacent blocks in the filtered image having summed values that exceed a second threshold value.

These and other features and examples are discussed in more detail below.

Whereas various examples are described herein, it will be apparent to those of ordinary skill in the art that many more examples and implementations are possible. Accordingly, the examples described herein are not the only possible examples and implementations. Furthermore, the advantages described above are not necessarily the only advantages, and it is not necessarily expected that all of the described advantages will be achieved with every example.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

FIG. 1 is a schematic diagram of a security system 100 configured to monitor geographically disparate locations in accordance with some examples. As shown in FIG. 1, the system 100 includes various devices disposed at a monitored location 102A, a monitoring center environment 120, a data center environment 124, one or more customer devices 122, and a communication network 118. Each of the monitoring center environment 120, the data center environment 124, the one or more customer devices 122, and the communication network 118 include one or more computing devices (e.g., as described below with reference to FIG. 19). Some or all of the devices disposed at the monitored location 102A may also include one or more computing devices. The one or more customer devices 122 are configured to host one or more customer interface applications 132. The monitoring center environment 120 is configured to host one or more monitor interface applications 130. The data center environment 124 is configured to host a surveillance service 128 and one or more transport services 126. In some examples, devices at the monitored location 102A include image capture devices 104 and 110, a contact sensor assembly 106, a keypad 108, a motion sensor assembly 112, a base station 114, and a router 116. The base station 114 hosts a surveillance client 136. The image capture device 110 hosts a camera agent 138. The security devices disposed at the monitored location 102A (e.g., devices 104, 106, 108, 110, 112, and 114) may be referred to herein as location-based devices.

In some examples, the router 116 is a wireless router that is configured to communicate with the location-based devices via communications that comport with a communications standard such as any of the various Institute of Electrical and Electronics Engineers (IEEE) 802.11 standards. As illustrated in FIG. 1, the router 116 is also configured to communicate with the network 118. It should be noted that the router 116 implements a local area network (LAN) within and proximate to the monitored location 102A by way of example only. Other networking technology that involves other computing devices is suitable for use within the location 102A. For instance, in some examples, the base station 114 can receive and forward communication packets transmitted by the image capture device 110 via a personal area network (PAN) protocol, such as BLUETOOTH. Additionally or alternatively, in some examples, the location-based devices communicate directly with one another using any of a variety of standards suitable for point-to-point use, such as any of the IEEE 802.11 standards, PAN standards, etc. In at least one example, the location-based devices can communicate with one another using a sub-GHz wireless networking standard, such as IEEE 802.11ah, Z-WAVE, ZIGBEE, etc.). Other wired, wireless, and mesh network technology and topologies will be apparent with the benefit of this disclosure and are intended to fall within the scope of the examples disclosed herein.

Continuing with the example of FIG. 1, the network 118 can include one or more public and/or private networks that support, for example, IP. The network 118 may include, for example, one or more LANs, one or more PANs, and/or one or more wide area networks (WANs). The LANs can include wired or wireless networks that support various LAN standards, such as a version of IEEE 802.11 and the like. The PANs can include wired or wireless networks that support various PAN standards, such as BLUETOOTH, ZIGBEE, and the like. The WANs can include wired or wireless networks that support various WAN standards, such as the Code Division Multiple Access (CMDA) radio standard, the Global System for Mobiles (GSM) radio standard, and the like. The network 118 connects and enables data communication between the computing devices within the monitored location 102A, the monitoring center environment 120, the data center environment 124, and the customer devices 122. In at least some examples, both the monitoring center environment 120 and the data center environment 124 include network equipment (e.g., similar to the router 116) that is configured to communicate with the network 118 and computing devices collocated with or near the network equipment. It should be noted that, in some examples, the network 118 and the network extant within the monitored location 102A support other communication protocols, such as MQTT or other IoT protocols.

Continuing with the example of FIG. 1, the data center environment 124 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 124 can be dedicated to the security system 100, can be a non-dedicated, commercially available cloud computing service (e.g., MICROSOFT AZURE, AMAZON WEB SERVICES, GOOGLE CLOUD, or the like), or can include a hybrid configuration made up of dedicated and non-dedicated resources. Regardless of its physical or logical configuration, as shown in FIG. 1, the data center environment 124 is configured to host the surveillance service 128 and the transport services 126.

Continuing with the example of FIG. 1, the monitoring center environment 120 can include a plurality of computing devices (e.g., desktop computers) and network equipment (e.g., one or more routers) connected to the computing devices and the network 118. The customer devices 122 can include personal computing devices (e.g., a desktop computer, laptop, tablet, smartphone, or the like) and network equipment (e.g., a router, cellular modem, cellular radio, or the like). As illustrated in FIG. 1, the monitoring center environment 120 is configured to host the monitor interfaces 130 and the customer devices 122 are configured to host the customer interfaces 132.

Continuing with the example of FIG. 1, the devices 104, 106, 110, and 112 are configured to acquire analog signals via sensors incorporated into the devices, generate digital sensor data based on the acquired signals, and communicate (e.g. via a wireless link with the router 116) the sensor data to the base station 114. The type of sensor data generated and communicated by these devices varies along with the type of sensors included in the devices. For instance, the image capture devices 104 and 110 can acquire ambient light, generate frames of image data based on the acquired light, and communicate the frames to the base station 114, the monitor interfaces 130, and/or the customer interfaces 132, although the pixel resolution and frame rate may vary depending on the capabilities of the devices. Where the image capture devices 104 and 110 have sufficient processing capacity and available power, the image capture devices 104 and 110 can process the image frames and transmit messages based on content depicted in the image frames, as described further below. These messages may specify reportable events and may be transmitted in place of, or in addition to, the image frames. Such messages may be sent directly to another location-based device (e.g., via sub-GHz networking) and/or indirectly to any device within the system 100 (e.g., via the router 116). As shown in FIG. 1, the image capture device 104 has a field of view (FOV) that originates proximal to a front door of the location 102A and can acquire images of a walkway, highway, and a space between the location 102A and the highway. The image capture device 110 has an FOV that originates proximal to a bathroom of the location 102A and can acquire images of a living room and dining area of the location 102A. The image capture device 110 can further acquire images of outdoor areas beyond the location 102A through windows 117A and 117B on the right side of the location 102A.

Further, as shown in FIG. 1, in some examples the image capture device 110 is configured to communicate with the surveillance service 128, the monitor interfaces 130, and the customer interfaces 132 separately from the surveillance client 136 via execution of the camera agent 138. These communications can include sensor data generated by the image capture device 110 and/or commands to be executed by the image capture device 110 sent by the surveillance service 128, the monitor interfaces 130, and/or the customer interfaces 132. The commands can include, for example, requests for interactive communication sessions in which monitoring personnel and/or customers interact with the image capture device 110 via the monitor interfaces 130 and the customer interfaces 132. These interactions can include requests for the image capture device 110 to transmit additional sensor data and/or requests for the image capture device 110 to render output via a user interface (e.g., the user interface 412 of FIGS. 4B and 4C). This output can include audio and/or video output.

Continuing with the example of FIG. 1, the contact sensor assembly 106 includes a sensor that can detect the presence or absence of a magnetic field generated by a magnet when the magnet is proximal to the sensor. When the magnetic field is present, the contact sensor assembly 106 generates Boolean sensor data specifying a closed state. When the magnetic field is absent, the contact sensor assembly 106 generates Boolean sensor data specifying an open state. In either case, the contact sensor assembly 106 can communicate, to the base station 114, sensor data indicating whether the front door of the location 102A is open or closed. The motion sensor assembly 112 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 112 generates Boolean sensor data specifying a still state. When the audio sensor does not detect a reflection because an object is in motion within the monitored space, the motion sensor assembly 112 generates Boolean sensor data specifying an alarm state. In either case, the motion sensor assembly 112 can communicate the sensor data to the base station 114. It should be noted that the specific sensing modalities described above are not limiting to the present disclosure. For instance, as one of many potential examples, the motion sensor assembly 112 can base its operation on acquisition of changes in temperature rather than changes in reflected sound waves.

Continuing with the example of FIG. 1, the keypad 108 is configured to interact with a user and interoperate with the other location-based devices in response to interactions with the user. For instance, in some examples, the keypad 108 is configured to receive input from a user that specifies one or more commands and to communicate the specified commands to one or more addressed processes. These addressed processes can include processes implemented by one or more of the location-based devices and/or one or more of the monitor interfaces 130 or the surveillance service 128. The commands can include, for example, codes that authenticate the user as a resident of the location 102A and/or codes that request activation or deactivation of one or more of the location-based devices. Alternatively or additionally, in some examples, the keypad 108 includes a user interface (e.g., a tactile interface, such as a set of physical buttons or a set of virtual buttons on a touchscreen) configured to interact with a user (e.g., receive input from and/or render output to the user). Further still, in some examples, the keypad 108 can receive and respond to the communicated commands and render the responses via the user interface as visual or audio output.

Continuing with the example of FIG. 1, the base station 114 is configured to interoperate with the other location-based devices to provide local command and control and store-and-forward functionality via execution of the surveillance client 136. In some examples, to implement store-and-forward functionality, the base station 114, through execution of the surveillance client 136, receives sensor data, packages the data for transport, and stores the packaged sensor data in local memory for subsequent communication. This communication of the packaged sensor data can include, for instance, transmission of the packaged sensor data as a payload of a message to one or more of the transport services 126 when a communication link to the transport services 126 via the network 118 is operational. In some examples, packaging the sensor data can include filtering the sensor data and/or generating one or more summaries (maximum values, minimum values, average values, changes in values since the previous communication of the same, etc.) of multiple sensor readings. To implement local command and control functionality, the base station 114 executes, under control of the surveillance client 136, a variety of programmatic operations in response to various events. Examples of these events can include reception of commands from the keypad 108, reception of commands from one of the monitor interfaces 130 or the customer interface application 132 via the network 118, or detection of the occurrence of a scheduled event. The programmatic operations executed by the base station 114 under control of the surveillance client 136 can include activation or deactivation of one or more of the devices 104, 106, 108, 110, and 112; sounding of an alarm; reporting an event to the surveillance service 128; and communicating location data to one or more of the transport services 126 to name a few operations. The location data can include data specifying sensor readings (sensor data), configuration data of any of the location-based devices, commands input and received from a user (e.g., via the keypad 108 or a customer interface 132), or data derived from one or more of these data types (e.g., filtered sensor data, summarizations of sensor data, event data specifying an event detected at the location via the sensor data, etc.).

Continuing with the example of FIG. 1, the transport services 126 are configured to securely, reliably, and efficiently exchange messages between processes implemented by the location-based devices and processes implemented by other devices in the system 100. These other devices can include the customer devices 122, devices disposed in the data center environment 124, and/or devices disposed in the monitoring center environment 120. In some examples, the transport services 126 are also configured to parse messages from the location-based devices to extract payloads included therein and store the payloads and/or data derived from the payloads within one or more data stores hosted in the data center environment 124. The data housed in these data stores may be subsequently accessed by, for example, the surveillance service 128, the monitor interfaces 130, and the customer interfaces 132.

In certain examples, the transport services 126 expose and implement one or more application programming interfaces (APIs) that are configured to receive, process, and respond to calls from processes (e.g., the surveillance client 136) implemented by base stations (e.g., the base station 114) and/or processes (e.g., the camera agent 138) implemented by other devices (e.g., the image capture device 110). Individual instances of a transport service within the transport services 126 can be associated with and specific to certain manufactures and models of location-based monitoring equipment (e.g., SIMPLISAFE equipment, RING equipment, etc.). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation (JSON) and/or extensible markup language (XML). These API calls are addressed to one or more uniform resource locators (URLs) that are API endpoints monitored by the transport services 126. In some examples, portions of the HTTP communications are encrypted to increase security. Alternatively or additionally, in some examples, the API is implemented as an MQTT broker that receives messages and transmits responsive messages to MQTT clients hosted by the base stations and/or the other devices. Alternatively or additionally, in some examples, the API is implemented using simple file transfer protocol commands. Thus, the transport services 126 are not limited to a particular protocol or architectural style. It should be noted that, in at least some examples, the transport services 126 can transmit one or more API calls to location-based devices to request data from, or an interactive communication session with, the location-based devices.

Continuing with the example of FIG. 1, the surveillance service 128 is configured to control overall logical setup and operation of the system 100. As such, the surveillance service 128 can interoperate with the transport services 126, the monitor interfaces 130, the customer interfaces 132, and any of the location-based devices. In some examples, the surveillance service 128 is configured to monitor data from a variety of sources for reportable events (e.g., a break-in event) and, when a reportable event is detected, notify one or more of the monitor interfaces 130 and/or the customer interfaces 132 of the reportable event. In some examples, the surveillance service 128 is also configured to maintain state information regarding the location 102A. This state information can indicate, for instance, whether the location 102A is safe or under threat. In certain examples, the surveillance service 128 is configured to change the state information to indicate that the location 102A is safe only upon receipt of a communication indicating a clear event (e.g., rather than making such a change in response to discontinuation of reception of break-in events). This feature can prevent a "crash and smash" robbery from being successfully executed. Further example processes that the surveillance service 128 is configured to execute are described below with reference to FIGS. 5 and 6.

Continuing with the example of FIG. 1, individual monitor interfaces 130 are configured to control computing device interaction with monitoring personnel and to execute a variety of programmatic operations in response to the interactions. For instance, in some examples, the monitor interface 130 controls its host device to provide information regarding reportable events detected at monitored locations, such as the location 102A, to monitoring personnel. Such events can include, for example, movement or an alarm condition generated by one or more of the location-based devices. Alternatively or additionally, in some examples, the monitor interface 130 controls its host device to interact with a user to configure features of the system 100. Further example processes that the monitor interface 130 is configured to execute are described below with reference to FIG. 6. It should be noted that, in at least some examples, the monitor interfaces 130 are browser-based applications served to the monitoring center environment 120 by webservers included within the data center environment 124. These webservers may be part of the surveillance service 128, in certain examples.

Continuing with the example of FIG. 1, individual customer interfaces 132 are configured to control computing device interaction with a customer and to execute a variety of programmatic operations in response to the interactions. For instance, in some examples, the customer interface 132 controls its host device to provide information regarding reportable events detected at monitored locations, such as the location 102A, to the customer. Such events can include, for example, an alarm condition generated by one or more of the location-based devices. Alternatively or additionally, in some examples, the customer interface 132 is configured to process input received from the customer to activate or deactivate one or more of the location-based devices. Further still, in some examples, the customer interface 132 configures features of the system 100 in response to input from a user. Further example processes that the customer interface 132 is configured to execute are described below with reference to FIG. 6.

Turning now to FIG. 2, an example base station 114 is schematically illustrated. As shown in FIG. 2, the base station 114 includes at least one processor 200, volatile memory 202, non-volatile memory 206, at least one network interface 204, a user interface 212, a battery assembly 214, and an interconnection mechanism 216. The non-volatile memory 206 stores executable code 208 and includes a data store 210. In some examples illustrated by FIG. 2, the features of the base station 114 enumerated above are incorporated within, or are a part of, a housing 218.

In some examples, the non-volatile (non-transitory) memory 206 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 208 stored in the non-volatile memory can include an operating system and one or more applications or programs that are configured to execute under the operating system. Alternatively or additionally, the code 208 can include specialized firmware and embedded software that is executable without dependence upon a commercially available operating system. Regardless, execution of the code 208 can implement the surveillance client 136 of FIG. 1 and can result in manipulated data that is a part of the data store 210.

Continuing with the example of FIG. 2, the processor 200 can include one or more programmable processors to execute one or more executable instructions, such as a computer program specified by the code 208, to control the operations of the base station 114. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 202) and executed by the circuitry. In some examples, the processor 200 is a digital processor, but the processor 200 can be analog, digital, or mixed. As such, the processor 200 can execute the function, operation, or sequence of operations using digital values and/or using analog signals. In some examples, the processor 200 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 200 that are multicore can provide functionality for parallel, simultaneous execution of instructions or for parallel, simultaneous execution of one instruction on more than one piece of data.

Continuing with the example of FIG. 2, prior to execution of the code 208 the processor 200 can copy the code 208 from the non-volatile memory 206 to the volatile memory 202. In some examples, the volatile memory 202 includes one or more static or dynamic random access memory (RAM) chips and/or cache memory (e.g. memory disposed on a silicon die of the processor 200). Volatile memory 202 can offer a faster response time than a main memory, such as the non-volatile memory 206.

Through execution of the code 208, the processor 200 can control operation of the network interface 204. For instance, in some examples, the network interface 204 includes one or more physical interfaces (e.g., a radio, an ethernet port, a universal serial bus (USB) port, etc.) and a software stack including drivers and/or other code 208 that is configured to communicate with the one or more physical interfaces to support one or more LAN, PAN, and/or WAN standard communication protocols. The communication protocols can include, for example, transmission control protocol (TCP), user datagram protocol (UDP), HTTP, and MQTT among others. As such, the network interface 204 enables the base station 114 to access and communicate with other computing devices (e.g., the location-based devices) via a computer network (e.g., the LAN established by the router 116 of FIG. 1, the network 118 of FIG. 1, and/or a point-to-point connection). For instance, in at least one example, the network interface 204 utilizes sub-GHz wireless networking to transmit messages to other location-based devices. These messages can include wake messages to the other computing devices to request streams of sensor data, alarm messages to trigger alarm responses, or other messages to initiate other operations. Bands that the network interface 204 may utilize for sub-GHz wireless networking include, for example, an 868 MHz band and/or a 915 MHz band. Use of sub-GHz wireless networking can improve operable communication distances and/or reduce power consumed to communicate.

Through execution of the code 208, the processor 200 can control operation of the user interface 212. For instance, in some examples, the user interface 212 includes user input and/or output devices (e.g., a keyboard, a mouse, a touchscreen, a display, a speaker, a camera, an accelerometer, a biometric scanner, an environmental sensor, etc.) and a software stack including drivers and/or other code 208 that is configured to communicate with the user input and/or output devices. For instance, the user interface 212 can be implemented by a customer device 122 hosting a mobile application (e.g., a customer interface 132). The user interface 212 enables the base station 114 to interact with users to receive input and/or render output. This rendered output can include, for instance, one or more graphical user interfaces (GUIs) including one or more controls configured to display output and/or receive input. The input can specify values to be stored in the data store 210. The output can indicate values stored in the data store 210. It should be noted that, in some examples, parts of the user interface 212 are accessible and/or visible as part of, or through, the housing 218. These parts of the user interface 212 can include, for example, one or more light-emitting diodes (LEDs). Alternatively or additionally, in some examples, the user interface 212 includes a 95 db siren that the processor 200 sounds to indicate that a break-in event has been detected.

Continuing with the example of FIG. 2, the various features of the base station 114 described above can communicate with one another via the interconnection mechanism 216. In some examples, the interconnection mechanism 216 includes a communications bus. In addition, in some examples, the battery assembly 214 is configured to supply operational power to the various features of the base station 114 described above. In some examples, the battery assembly 214 includes at least one rechargeable battery (e.g., one or more NiMH or lithium batteries). In some examples, the rechargeable battery has a runtime capacity sufficient to operate the base station 114 for 24 hours or longer while the base station 114 is disconnected from or otherwise not receiving line power. Alternatively or additionally, in some examples, the battery assembly 214 includes power supply circuitry to receive, condition, and distribute line power to both operate the base station 114 and recharge the rechargeable battery. The power supply circuitry can include, for example, a transformer and a rectifier, among other circuitry, to convert AC line power to DC device and recharging power.

Turning now to FIG. 3, an example keypad 108 is schematically illustrated. As shown in FIG. 3, the keypad 108 includes at least one processor 300, volatile memory 302, non-volatile memory 306, at least one network interface 304, a user interface 312, a battery assembly 314, and an interconnection mechanism 316. The non-volatile memory 306 stores executable code 308 and a data store 310. In some examples illustrated by FIG. 3, the features of the keypad 108 enumerated above are incorporated within, or are a part of, a housing 318.

In some examples, the respective descriptions of the processor 200, the volatile memory 202, the non-volatile memory 206, the interconnection mechanism 216, and the battery assembly 214 with reference to the base station 114 are applicable to the processor 300, the volatile memory 302, the non-volatile memory 306, the interconnection mechanism 316, and the battery assembly 314 with reference to the keypad 108. As such, those descriptions will not be repeated.

Continuing with the example of FIG. 3, through execution of the code 308, the processor 300 can control operation of the network interface 304. In some examples, the network interface 304 includes one or more physical interfaces (e.g., a radio, an ethernet port, a USB port, etc.) and a software stack including drivers and/or other code 308 that is configured to communicate with the one or more physical interfaces to support one or more LAN, PAN, and/or WAN standard communication protocols. These communication protocols can include, for example, TCP, UDP, HTTP, and MQTT among others. As such, the network interface 304 enables the keypad 108 to access and communicate with other computing devices (e.g., the other location-based devices) via a computer network (e.g., the LAN established by the router 116 and/or a point-to-point connection).

Continuing with the example of FIG. 3, through execution of the code 308, the processor 300 can control operation of the user interface 312. In some examples, the user interface 312 includes user input and/or output devices (e.g., physical keys arranged as a keypad, a touchscreen, a display, a speaker, a camera, a biometric scanner, an environmental sensor, etc.) and a software stack including drivers and/or other code 308 that is configured to communicate with the user input and/or output devices. As such, the user interface 312 enables the keypad 108 to interact with users to receive input and/or render output. This rendered output can include, for instance, one or more GUIs including one or more controls configured to display output and/or receive input. The input can specify values to be stored in the data store 310. The output can indicate values stored in the data store 310. It should be noted that, in some examples, parts of the user interface 312 (e.g., one or more LEDs) are accessible and/or visible as part of, or through, the housing 318.

In some examples, devices like the keypad 108, which rely on user input to trigger an alarm condition, may be included within a security system, such as the security system 100 of FIG. 1. Examples of such devices include dedicated key fobs and panic buttons. These dedicated security devices provide a user with a simple, direct way to trigger an alarm condition, which can be particularly helpful in times of duress.

Figure 4A:
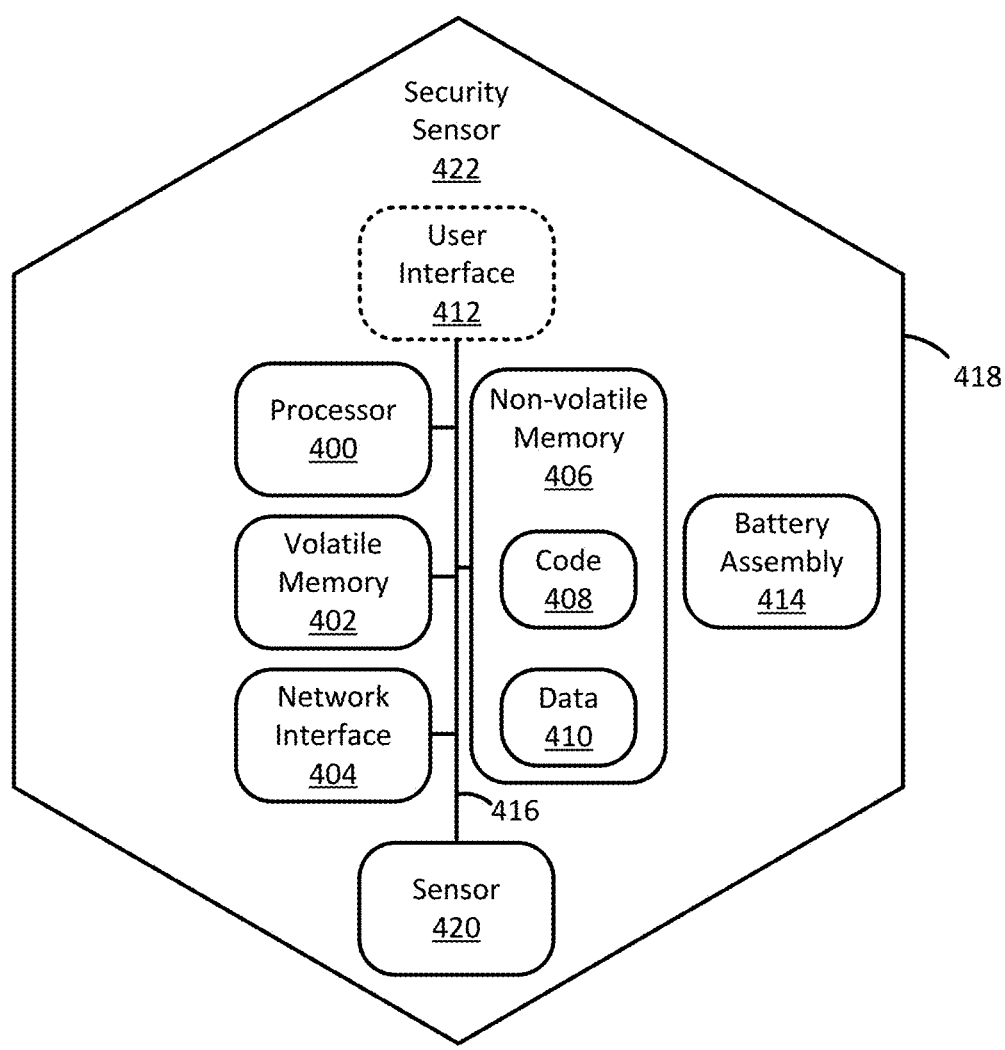
FIG. 4A is a schematic diagram of a security sensor, according to some examples described herein.

Turning now to FIG. 4A, an example security sensor 422 is schematically illustrated. Particular configurations of the security sensor 422 (e.g., the image capture devices 104 and 110, the motion sensor assembly 112, and the contact sensor assemblies 106) are illustrated in FIG. 1 and described above. Other examples of security sensors 422 include glass break sensors, carbon monoxide sensors, smoke detectors, water sensors, temperature sensors, and door lock sensors, to name a few. As shown in FIG. 4A, the security sensor 422 includes at least one processor 400, volatile memory 402, non-volatile memory 406, at least one network interface 404, a battery assembly 414, an interconnection mechanism 416, and at least one sensor assembly 420. The non-volatile memory 406 stores executable code 408 and a data store 410. Some examples include a user interface 412. In certain examples illustrated by FIG. 4A, the features of the security sensor 422 enumerated above are incorporated within, or are a part of, a housing 418.

In some examples, the respective descriptions of the processor 200, the volatile memory 202, the non-volatile memory 206, the interconnection mechanism 216, and the battery assembly 214 with reference to the base station 114 are applicable to the processor 400, the volatile memory 402, the non-volatile memory 406, the interconnection mechanism 416, and the battery assembly 414 with reference to the security sensor 422. As such, those descriptions will not be repeated.

Continuing with the example of FIG. 4A, through execution of the code 408, the processor 400 can control operation of the network interface 404. In some examples, the network interface 404 includes one or more physical interfaces (e.g., a radio (including an antenna), an ethernet port, a USB port, etc.) and a software stack including drivers and/or other code 408 that is configured to communicate with the one or more physical interfaces to support one or more LAN, PAN, and/or WAN standard communication protocols. The communication protocols can include, for example, TCP, UDP, HTTP, and MQTT among others. As such, the network interface 404 enables the security sensor 422 to access and communicate with other computing devices (e.g., the other location-based devices) via a computer network (e.g., the LAN established by the router 116 and/or a point-to-point connection). For instance, in at least one example, when executing the code 408, the processor 400 controls the network interface to stream (e.g., via UDP) sensor data acquired from the sensor assembly 420 to the base station 114. Alternatively or additionally, in at least one example, through execution of the code 408, the processor 400 can control the network interface 404 to enter a power conservation mode by powering down a 2.4 GHz radio and powering up a sub-GHz radio that are both included in the network interface 404. In this example, through execution of the code 408, the processor 400 can control the network interface 404 to enter a streaming or interactive mode by powering up a 2.4 GHz radio and powering down a sub-GHz radio, for example, in response to receiving a wake signal from the base station via the sub-GHz radio.

Continuing with the example of FIG. 4A, through execution of the code 408, the processor 400 can control operation of the user interface 412. In some examples, the user interface 412 includes user input and/or output devices (e.g., physical buttons, a touchscreen, a display, a speaker, a camera, an accelerometer, a biometric scanner, an environmental sensor, one or more LEDs, etc.) and a software stack including drivers and/or other code 408 that is configured to communicate with the user input and/or output devices. As such, the user interface 412 enables the security sensor 422 to interact with users to receive input and/or render output. This rendered output can include, for instance, one or more GUIs including one or more controls configured to display output and/or receive input. The input can specify values to be stored in the data store 410. The output can indicate values stored in the data store 410. It should be noted that, in some examples, parts of the user interface 412 are accessible and/or visible as part of, or through, the housing 418.

Continuing with the example of FIG. 4A, the sensor assembly 420 can include one or more types of sensors, such as the sensors described above with reference to the image capture devices 104 and 110, the motion sensor assembly 112, and the contact sensor assembly 106 of FIG. 1, or other types of sensors. For instance, in at least one example, the sensor assembly 420 includes an image sensor (e.g., a charge-coupled device or an active-pixel sensor) and a temperature or thermographic sensor (e.g., an active and/or passive infrared (PIR) sensor). Regardless of the type of sensor or sensors housed, the processor 400 can (e.g., via execution of the code 408) acquire sensor data from the housed sensor and stream the acquired sensor data to the processor 400 for communication to the base station.

It should be noted that, in some examples of the devices 108 and 422, the operations executed by the processors 300 and 400 while under control of respective control of the code 308 and 408 may be hardcoded and/or implemented in hardware, rather than as a combination of hardware and software. Moreover, execution of the code 408 can implement the camera agent 138 of FIG. 1 and can result in manipulated data that is a part of the data store 410.

Figure 4B:
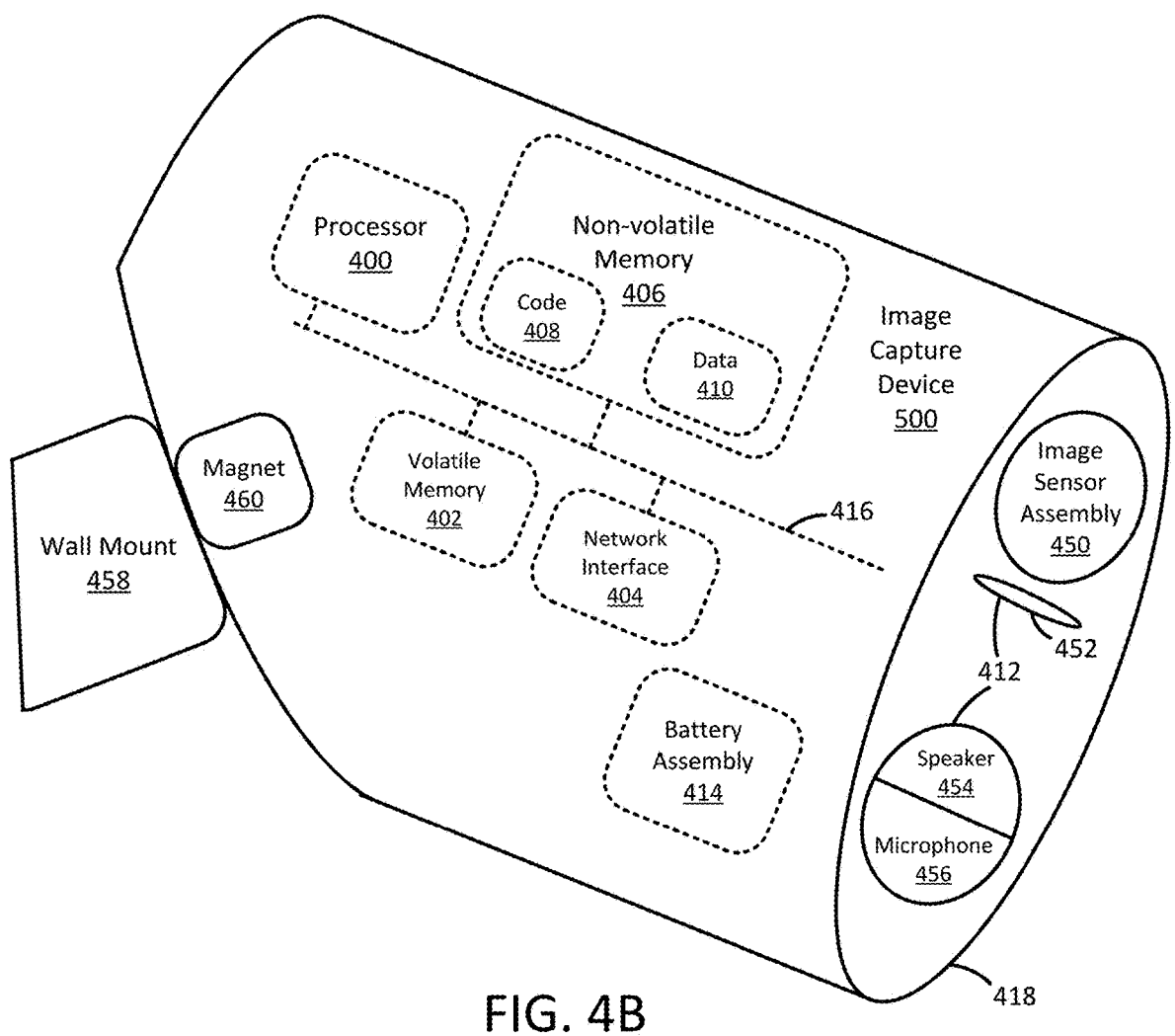
FIG. 4B is a schematic diagram of an image capture device, according to some examples described herein.

Turning now to FIG. 4B, an example image capture device 500 is schematically illustrated. Particular configurations of the image capture device 500 (e.g., the image capture devices 104 and 110) are illustrated in FIG. 1 and described above. As shown in FIG. 4B, the image capture device 500 includes at least one processor 400, volatile memory 402, non-volatile memory 406, at least one network interface 404, a battery assembly 414, and an interconnection mechanism 416. These features of the image capture device 500 are illustrated in dashed lines to indicate that they reside within a housing 418. The non-volatile memory 406 stores executable code 408 and a data store 410.

Some examples further include an image sensor assembly 450, a light 452, a speaker 454, a microphone 456, a wall mount 458, and a magnet 460. The image sensor assembly 450 may include a lens and an image sensor (e.g., a charge-coupled device or an active-pixel sensor) and/or a temperature or thermographic sensor (e.g., an active and/or passive infrared (PIR) sensor). The light 452 may include a light emitting diode (LED), such as a red-green-blue emitting LED. The light 452 may also include an infrared emitting diode in some examples. The speaker 454 may include a transducer configured to emit sound in the range of 60 dB to 80 dB or louder. Further, in some examples, the speaker 454 can include a siren configured to emit sound in the range of 70 dB to 90 db or louder. The microphone 456 may include a micro electro-mechanical system (MEMS) microphone. The wall mount 458 may include a mounting bracket, configured to accept screws or other fasteners that adhere the bracket to a wall, and a cover configured to mechanically couple to the mounting bracket. In some examples, the cover is composed of a magnetic material, such as aluminum or stainless steel, to enable the magnet 460 to magnetically couple to the wall mount 458, thereby holding the image capture device 500 in place.

In some examples, the respective descriptions of the processor 400, the volatile memory 402, the network interface 404, the non-volatile memory 406, the code 408 with respect to the network interface 404, the interconnection mechanism 416, and the battery assembly 414 with reference to the security sensor 422 are applicable to these same features with reference to the image capture device 500. As such, those descriptions will not be repeated here.

Continuing with the example of FIG. 4B, through execution of the code 408, the processor 400 can control operation of the image sensor assembly 450, the light 452, the speaker 454, and the microphone 456. For instance, in at least one example, when executing the code 408, the processor 400 controls the image sensor assembly 450 to acquire sensor data, in the form of image data, to be streamed to the base station 114 (or one of the processes 130, 128, or 132 of FIG. 1) via the network interface 404. Alternatively or additionally, in at least one example, through execution of the code 408, the processor 400 controls the light 452 to emit light so that the image sensor assembly 450 collects sufficient reflected light to compose the image data. Further, in some examples, through execution of the code 408, the processor 400 controls the speaker 454 to emit sound. This sound may be locally generated (e.g., a sonic alarm via the siren) or streamed from the base station 114 (or one of the processes 130, 128 or 132 of FIG. 1) via the network interface 404 (e.g., utterances from the user or monitoring personnel). Further still, in some examples, through execution of the code 408, the processor 400 controls the microphone 456 to acquire sensor data in the form of sound for streaming to the base station 114 (or one of the processes 130, 128 or 132 of FIG. 1) via the network interface 404.

It should be appreciated that in the example of FIG. 4B, the light 452, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 500 illustrated in FIG. 4B is at least one example of the security sensor 422 illustrated in FIG. 4A. The image capture device 500 may be a battery-powered outdoor sensor configured to be installed and operated in an outdoor environment, such as outside a home, office, store, or other commercial or residential building, for example.

Figure 4C:
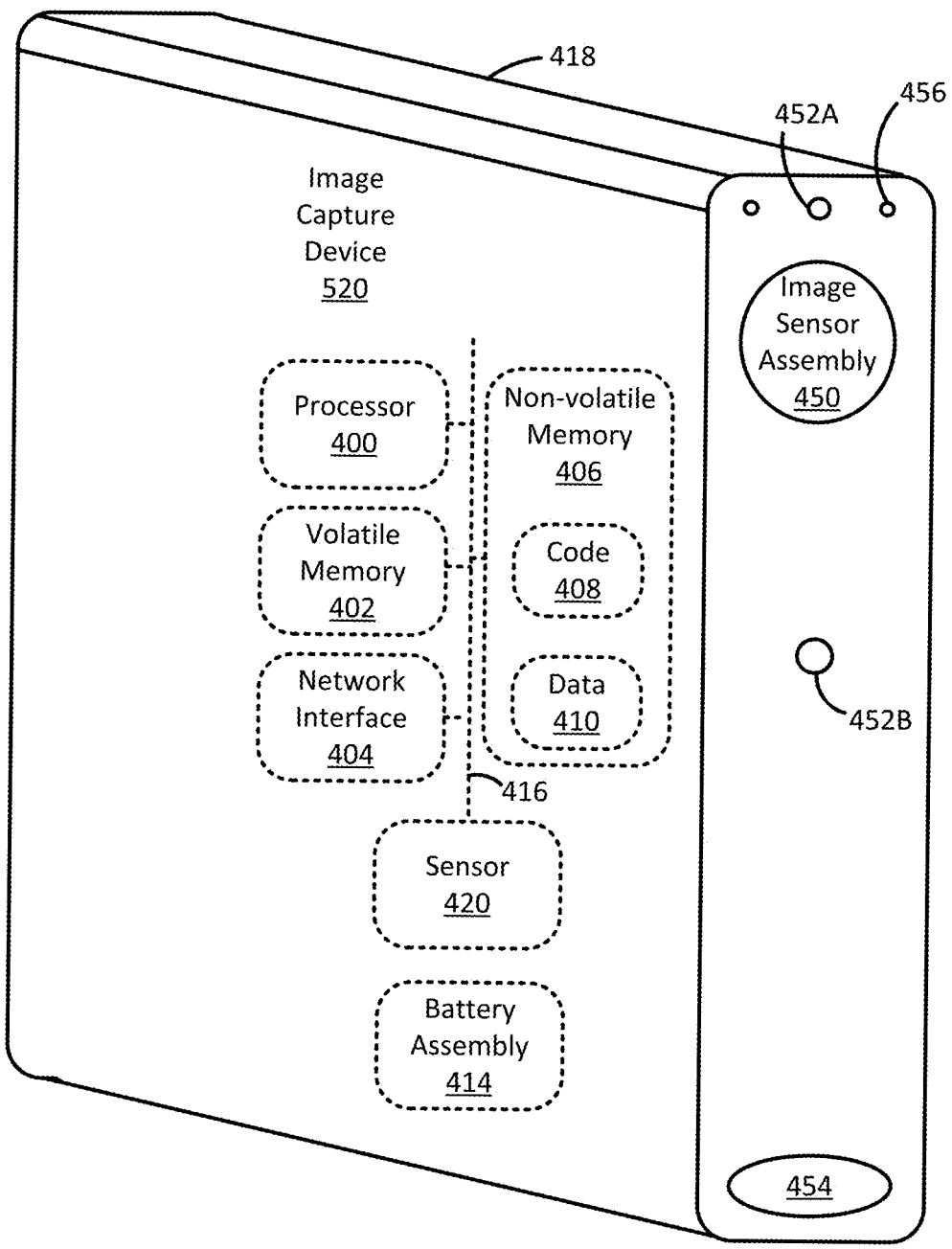
FIG. 4C is a schematic diagram of an image capture device, according to some examples described herein.

Turning now to FIG. 4C, another example image capture device 520 is schematically illustrated. Particular configurations of the image capture device 520 (e.g., the image capture devices 104 and 110) are illustrated in FIG. 1 and described above. As shown in FIG. 4C, the image capture device 520 includes at least one processor 400, volatile memory 402, non-volatile memory 406, at least one network interface 404, a battery assembly 414, and an interconnection mechanism 416. These features of the image capture device 520 are illustrated in dashed lines to indicate that they reside within a housing 418. The non-volatile memory 406 stores executable code 408 and a data store 410. The image capture device 520 further includes an image sensor assembly 450, a speaker 454, and a microphone 456 as described above with reference to the image capture device 500 of FIG. 4B.

In some examples, the image capture device 520 further includes lights 452A and 452B. The light 452A may include a light emitting diode (LED), such as a red-green-blue emitting LED. The light 452B may also include an infrared emitting diode to enable night vision in some examples.

It should be appreciated that in the example of FIG. 4C, the lights 452A and 452B, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 520 illustrated in FIG. 4C is at least one example of the security sensor 422 illustrated in FIG. 4A. The image capture device 520 may be a battery-powered indoor sensor configured to be installed and operated in an indoor environment, such as within a home, office, store, or other commercial or residential building, for example.

Figure 5:
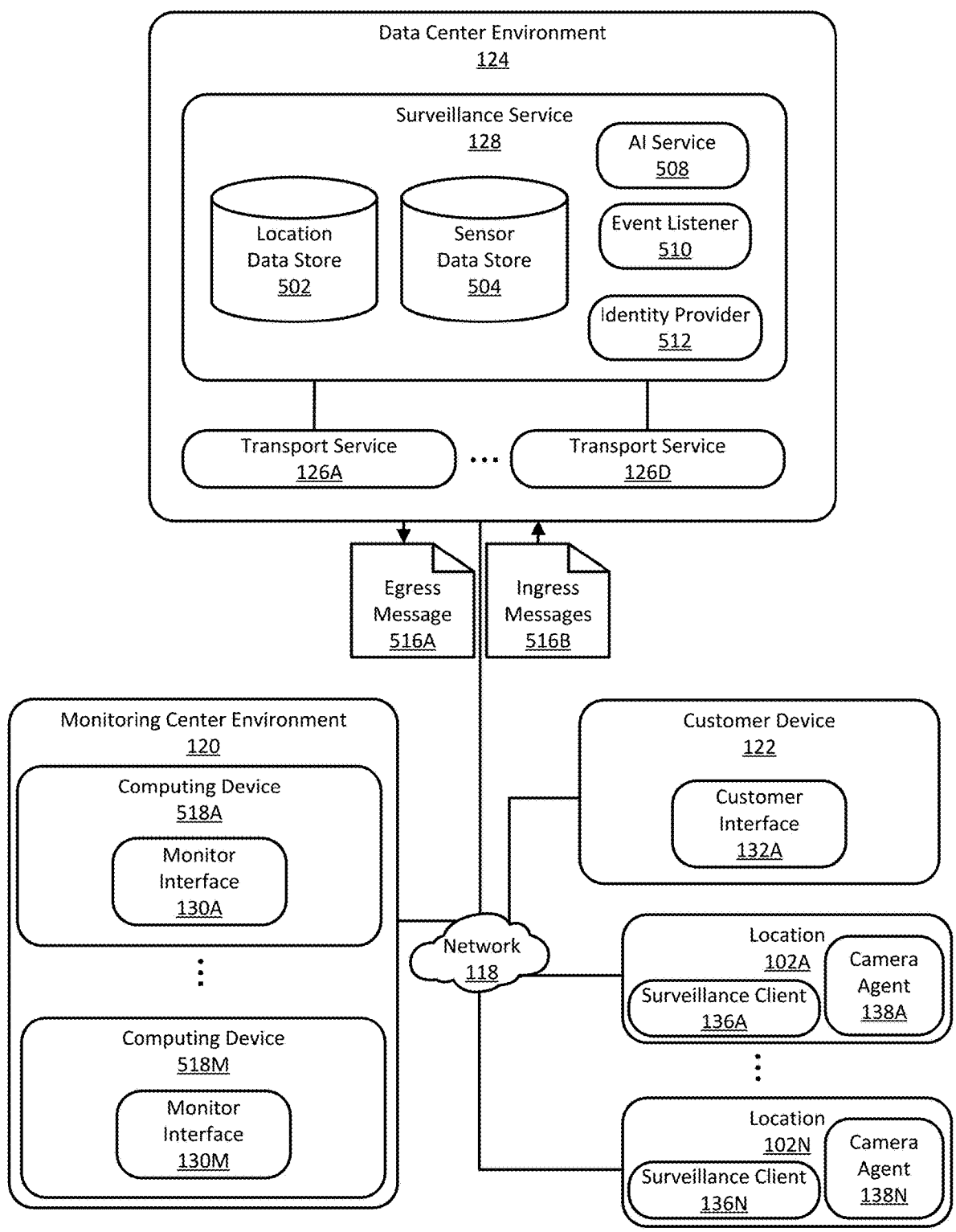
FIG. 5 is a schematic diagram of a data center environment, a monitoring center environment, and a customer device, according to some examples described herein.

Turning now to FIG. 5, aspects of the data center environment 124 of FIG. 1, the monitoring center environment 120 of FIG. 1, one of the customer devices 122 of FIG. 1, the network 118 of FIG. 1, and a plurality of monitored locations 102A through 102N of FIG. 1 (collectively referred to as the locations 102) are schematically illustrated. As shown in FIG. 5, the data center environment 124 hosts the surveillance service 128 and the transport services 126 (individually referred to as the transport services 126A through 126D). The surveillance service 128 includes a location data store 502, a sensor data store 504, an artificial intelligence (AI) service 508, an event listening service 510, and an identity provider 512. The monitoring center environment 120 includes computing devices 518A through 518M (collectively referred to as the computing devices 518) that host monitor interfaces 130A through 130M. Individual locations 102A through 102N include base stations (e.g., the base station 114 of FIG. 1, not shown) that host the surveillance clients 136A through 136N (collectively referred to as the surveillance clients 136) and image capture devices (e.g., the image capture device 110 of FIG. 1, not shown) that host the software camera agents 138A through 138N (collectively referred to as the camera agents 138).

As shown in FIG. 5, the transport services 126 are configured to process ingress messages 516B from the customer interface 132A, the surveillance clients 136, the camera agents 138, and/or the monitor interfaces 130. The transport services 126 are also configured to process egress messages 516A addressed to the customer interface 132A, the surveillance clients 136, the camera agents 138, and the monitor interfaces 130. The location data store 502 is configured to store, within a plurality of records, location data in association with identifiers of customers for whom the location is monitored. For example, the location data may be stored in a record with an identifier of a customer and/or an identifier of the location to associate the location data with the customer and the location. The sensor data store 504 is configured to store, within a plurality of records, sensor data (e.g., one or more frames of image data) separately from other location data but in association with identifiers of locations and timestamps at which the sensor data was acquired. In some examples, the sensor data store 504 is optional and may be use, for example, where the sensor data house therein has specialized storage or processing requirements.

Continuing with the example of FIG. 5, the AI service 508 is configured to process sensor data (e.g., images and/or sequences of images) to identify movement, human faces, and other features within the sensor data. The event listening service 510 is configured to scan location data transported via the ingress messages 516B for event data and, where event data is identified, execute one or more event handlers to process the event data. In some examples, the event handlers can include an event reporter that is configured to identify reportable events and to communicate messages specifying the reportable events to one or more recipient processes (e.g., a customer interface 132 and/or a monitor interface 130). In some examples, the event listening service 510 can interoperate with the AI service 508 to identify events from sensor data. The identity provider 512 is configured to receive, via the transport services 126, authentication requests from the surveillance clients 136 or the camera agents 138 that include security credentials. When the identity provider 512 can authenticate the security credentials in a request (e.g., via a validation function, cross-reference look-up, or some other authentication process), the identity provider 512 can communicate a security token in response to the request. A surveillance client 136 or a camera agent 138 can receive, store, and include the security token in subsequent ingress messages 516B, so that the transport service 126A is able to securely process (e.g., unpack/parse) the packages included in the ingress messages 516B to extract the location data prior to passing the location data to the surveillance service 128.

Continuing with the example of FIG. 5, the transport services 126 are configured to receive the ingress messages 516B, verify the authenticity of the messages 516B, parse the messages 516B, and extract the location data encoded therein prior to passing the location data to the surveillance service 128 for processing. This location data can include any of the location data described above with reference to FIG. 1. Individual transport services 126 may be configured to process ingress messages 516B generated by location-based monitoring equipment of a particular manufacturer and/or model. The surveillance clients 136 and the camera agents 138 are configured to generate and communicate, to the surveillance service 128 via the network 118, ingress messages 516B that include packages of location data based on sensor information received at the locations 102.

Continuing with the example of FIG. 5, the computing devices 518 are configured to host the monitor interfaces 130. In some examples, individual monitor interfaces 130A-130M are configured to render GUIs including one or more image frames and/or other sensor data. In certain examples, the customer device 122 is configured to host the customer interface 132. In some examples, customer interface 132 is configured to render GUIs including one or more image frames and/or other sensor data. Additional features of the monitor interfaces 130 and the customer interface 132 are described further below with reference to FIG. 6.

Figure 6:
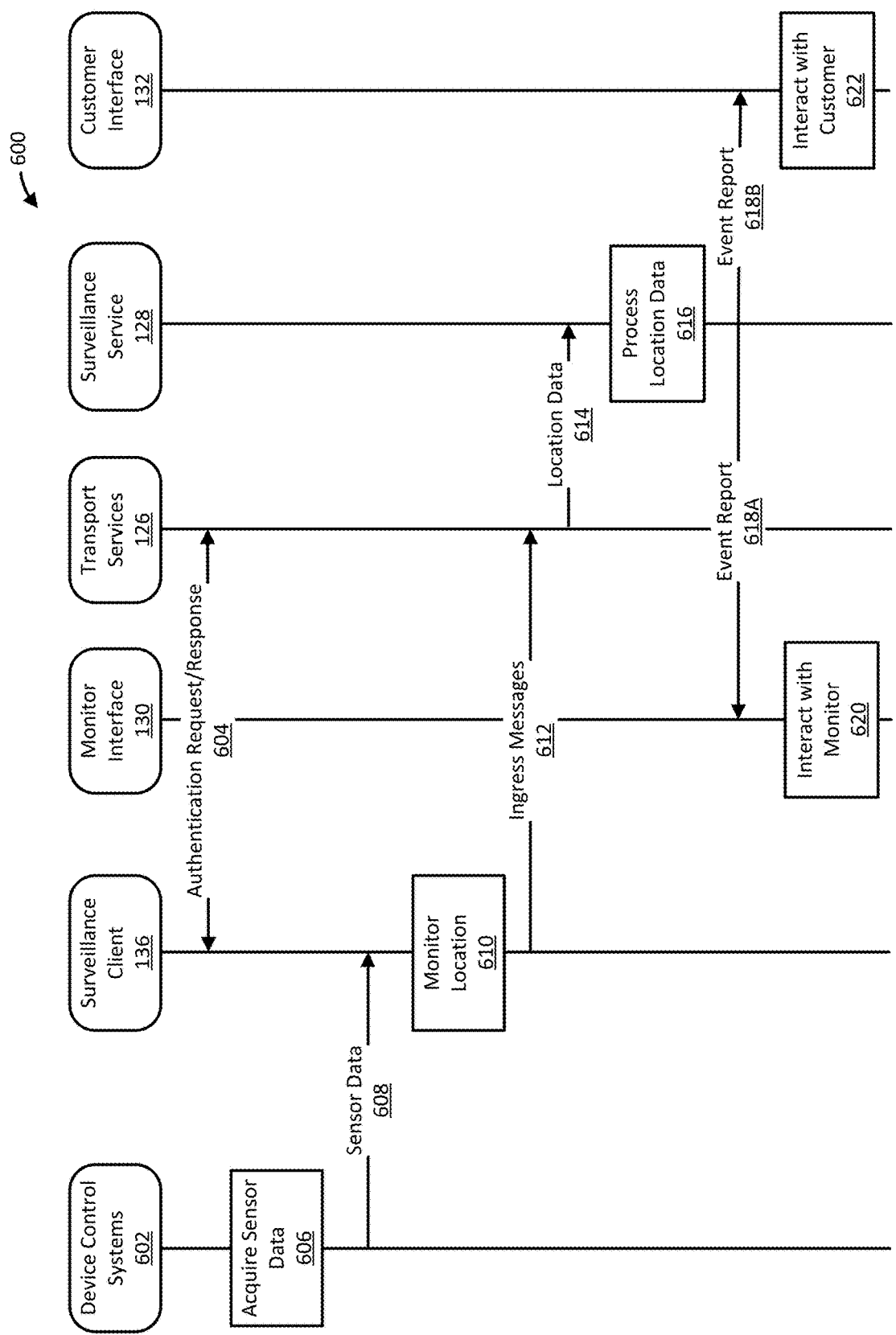
FIG. 6 is a sequence diagram of a monitoring process, according to some examples described herein.

Turning now to FIG. 6, a monitoring process 600 is illustrated as a sequence diagram. The process 600 can be executed, in some examples, by a security system (e.g., the security system 100 of FIG. 1). More specifically, in some examples, at least a portion of the process 600 is executed by the location-based devices under the control of device control system (DCS) code (e.g., either the code 308 or 408) implemented by at least one processor (e.g., either of the processors 300 or 400 of FIGS. 3-4C). The DCS code can include, for example, a camera agent (e.g., the camera agent 138 of FIG. 1). At least a portion of the process 600 is executed by a base station (e.g., the base station 114 of FIG. 1) under control of a surveillance client (e.g., the surveillance client 136 of FIG. 1). At least a portion of the process 600 is executed by a monitoring center environment (e.g., the monitoring center environment 120 of FIG. 1) under control of a monitor interface (e.g., the monitor interface 130 of FIG. 1). At least a portion of the process 600 is executed by a data center environment (e.g., the data center environment 124 of FIG. 1) under control of a surveillance service (e.g., the surveillance service 128 of FIG. 1) or under control of transport services (e.g., the transport services 126 of FIG. 1). At least a portion of the process 600 is executed by a customer device (e.g., the customer device 122 of FIG. 1) under control of a customer interface (e.g., customer interface 132 of FIG. 1).

As shown in FIG. 6, the process 600 starts with the surveillance client 136 authenticating with an identity provider (e.g., the identity provider 512 of FIG. 5) by exchanging one or more authentication requests and responses 604 with the transport service 126. More specifically, in some examples, the surveillance client 136 communicates an authentication request to the transport service 126 via one or more API calls to the transport service 126. In these examples, the transport service 126 parses the authentication request to extract security credentials therefrom and passes the security credentials to the identity provider for authentication. In some examples, if the identity provider authenticates the security credentials, the identity provider generates a security token and transmits the security token to the transport service 126. The transport service 126, in turn, receives a security token and communicates the security token as a payload within an authentication response to the authentication request. In these examples, if the identity provider is unable to authenticate the security credentials, the transport service 126 generates an error code and communicates the error code as the payload within the authentication response to the authentication request. Upon receipt of the authentication response, the surveillance client 136 parses the authentication response to extract the payload. If the payload includes the error code, the surveillance client 136 can retry authentication and/or interoperate with a user interface of its host device (e.g., the user interface 212 of the base station 114 of FIG. 2) to render output indicating the authentication failure. If the payload includes the security token, the surveillance client 136 stores the security token for subsequent use in communication of location data via ingress messages. It should be noted that the security token can have a limited lifespan (e.g., 1 hour, 1 day, 1 week, 1 month, etc.) after which the surveillance client 136 may be required to reauthenticate with the transport services 126.

Continuing with the process 600, one or more DCSs 602 hosted by one or more location-based devices acquire (at operation 606) sensor data descriptive of a location (e.g., the location 102A of FIG. 1). The sensor data acquired can be any of a variety of types, as discussed above with reference to FIGS. 1-4C. In some examples, one or more of the DCSs 602 acquire sensor data continuously. In some examples, one or more of the DCSs 602 acquire sensor data in response to an event, such as expiration of a local timer (a push event) or receipt of an acquisition polling signal communicated by the surveillance client 136 (a poll event). In certain examples, one or more of the DCSs 602 stream sensor data to the surveillance client 136 with minimal processing beyond acquisition and digitization. In these examples, the sensor data may constitute a sequence of vectors with individual vector members including a sensor reading and a timestamp. Alternatively or additionally, in some examples, one or more of the DCSs 602 execute additional processing of sensor data, such as generation of one or more summaries of multiple sensor readings. Further still, in some examples, one or more of the DCSs 602 execute sophisticated processing of sensor data. For instance, if the security sensor includes an image capture device, the security sensor may execute image processing routines such as edge detection, motion detection, facial recognition, threat assessment, and reportable event generation.

Continuing with the process 600, the DCSs 602 communicate the sensor data 608 to the surveillance client 136. As with sensor data acquisition, the DCSs 602 can communicate the sensor data 608 continuously or in response to an event, such as a push event (originating with the DCSs 602) or a poll event (originating with the surveillance client 136).

Continuing with the process 600, the surveillance client 136 monitors 610 the location by processing the received sensor data 608. For instance, in some examples, the surveillance client 136 executes one or more image processing routines. These image processing routines may include any of the image processing routines described above with reference to the operation 606. By distributing at least some of the image processing routines between the DCSs 602 and surveillance clients 136, some examples decrease power consumed by battery-powered devices by off-loading processing to line-powered devices. Moreover, in some examples, the surveillance client 136 may execute an ensemble threat detection process that utilizes sensor data 608 from multiple, distinct DCSs 602 as input. For instance, in at least one example, the surveillance client 136 will attempt to corroborate an open state received from a contact sensor with motion and facial recognition processing of an image of a scene including a window to which the contact sensor is affixed. If two or more of the three processes indicate the presence of an intruder, the threat score is increased and or a break-in event is declared, locally recorded, and communicated. Other processing that the surveillance client 136 may execute includes outputting local alarms (e.g., in response to detection of particular events and/or satisfaction of other criteria) and detection of maintenance conditions for location-based devices, such as a need to change or recharge low batteries and/or replace/maintain the devices that host the DCSs 602. Any of the processes described above within the operation 610 may result in the creation of location data that specifies the results of the processes.

Continuing with the process 600, the surveillance client 136 communicates the location data 614 to the surveillance service 128 via one or more ingress messages 612 to the transport services 126. As with sensor data 608 communication, the surveillance client 136 can communicate the location data 614 continuously or in response to an event, such as a push event (originating with the surveillance client 136) or a poll event (originating with the surveillance service 128).

Continuing with the process 600, the surveillance service 128 processes 616 received location data. For instance, in some examples, the surveillance service 128 executes one or more routines described above with reference to the operations 606 and/or 610. Additionally or alternatively, in some examples, the surveillance service 128 calculates a threat score or further refines an existing threat score using historical information associated with the location identified in the location data and/or other locations geographically proximal to the location (e.g., within the same zone improvement plan (ZIP) code). For instance, in some examples, if multiple break-ins have been recorded for the location and/or other locations within the same ZIP code within a configurable time span including the current time, the surveillance service 128 may increase a threat score calculated by a DCS 602 and/or the surveillance client 136. In some examples, the surveillance service 128 determines, by applying a set of rules and criteria to the location data 614, whether the location data 614 includes any reportable events and, if so, communicates an event report 618A and/or 618B to the monitor interface 130 and/or the customer interface 132. A reportable event may be an event of a certain type (e.g., break-in) or an event of a certain type that satisfies additional criteria (e.g., movement within a particular zone combined with a threat score that exceeds a threshold value). The event reports 618A and/or 618B may have a priority based on the same criteria used to determine whether the event reported therein is reportable or may have a priority based on a different set of criteria or rules.

Continuing with the process 600, the monitor interface 130 interacts 620 with monitoring personnel through, for example, one or more GUIs. These GUIs may provide details and context regarding one or more events that warrant reporting to a user. In some examples, the monitor interface 130 is configured to interact with monitoring personnel to both receive input and render output regarding alarms triggered at monitored locations, such as the location 102A. For instance, in some examples, the monitor interface 130 is configured to notify monitoring personnel of the occurrence of alarms at monitored locations, render audio-visual data and other sensor data collected by location-based devices at the monitored locations and stored in the data stores 502 and/or 504, and establish real-time connections with location-based devices. Further, in some examples, the monitor interface 130 includes controls configured to receive input specifying actions taken by the monitoring personnel to address the alarms, such as interacting with actors including customers, customer contacts, dispatchers, and/or first responders called upon to investigate the alarms. These actions can include, for example, taking or making calls from or to customers regarding an alarm; verifying the authenticity of the alarm; making contact with individuals at a location reporting an alarm; calling an appropriate Public Service Answering Point (PSAP) to request dispatch of emergency responders, such as police, fire, or emergency medical services; updating status information regarding such dispatches; updating status information for alarm; and canceling alarms and/or dispatched responders, to name a few actions. Some or all of these and other actions may be translated, by the monitor interface 130, into events that are communicated to the surveillance service 128 via a monitoring API, for example.

Continuing with the process 600, the customer interface 132 interacts 622 with at least one customer through, for example, one or more GUIs. These GUIs may provide details and context regarding one or more reportable events.

It should be noted that the processing of sensor data and/or location data, as described above with reference to the operations 606, 610, and 616, may be executed by processors disposed within various parts of the system 100. For instance, in some examples, the DCSs 602 execute minimal processing of the sensor data (e.g., acquisition and streaming only) and the remainder of the processing described above is executed by the surveillance client 136 and/or the surveillance service 128. This approach may be helpful to prolong battery runtime of location-based devices. In other examples, the DCSs 602 execute as much of the sensor data processing as possible, leaving the surveillance client 136 and the surveillance service 128 to execute only processes that require sensor data that spans location-based devices and/or locations. This approach may be helpful to increase scalability of the system 100 with regard to adding new locations.

Figure 7:
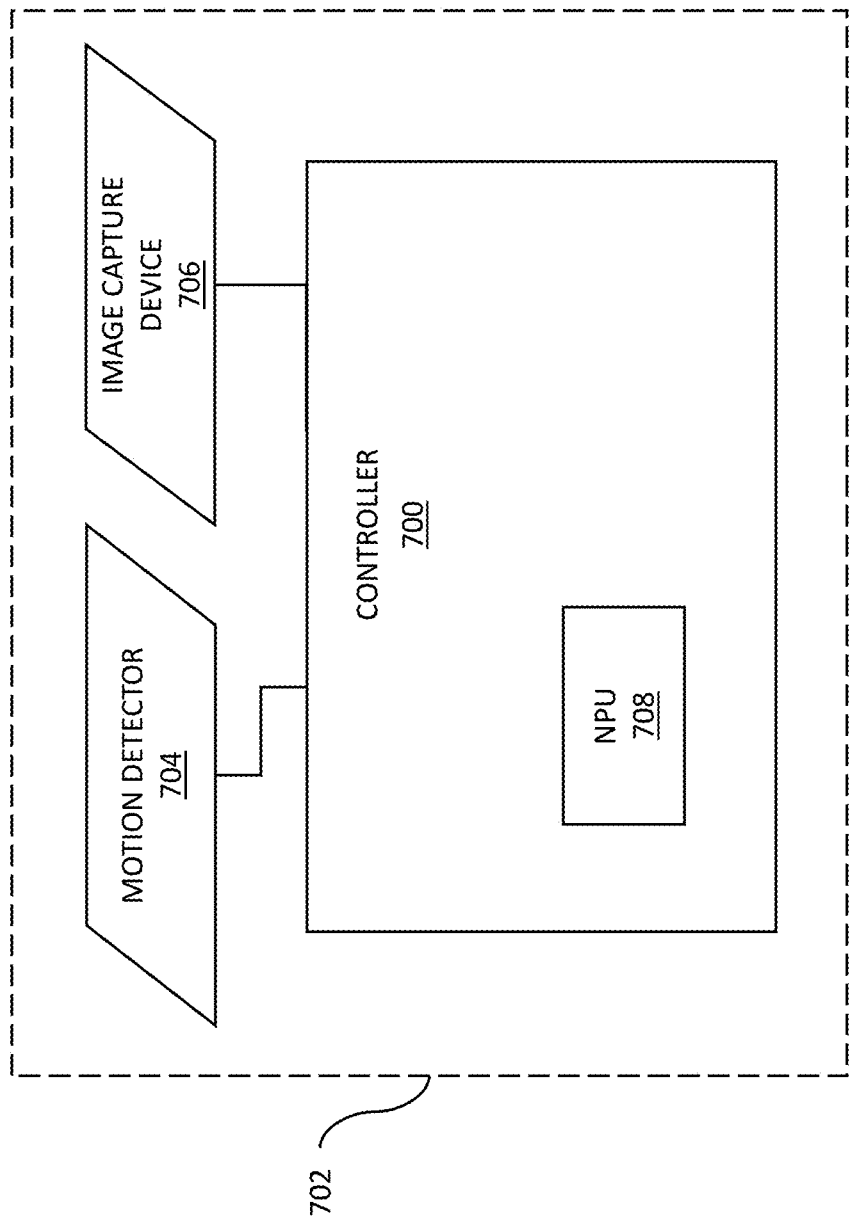
FIG. 7 is a schematic diagram of one example of a sensor according to some examples described herein.

Turning now to FIG. 7, there is illustrated an example of a sensor 702 configured to implement various techniques disclosed herein. The sensor 702 can be associated with a security system installed at a monitored location, as discussed above. The sensor 702 includes a motion detector 704 and an image capture device (e.g., a camera) 706 that are electrically coupled to a controller 700. The controller may include or may be implemented by one or more processors, such as the processor 400 discussed above, for example. The sensor 702 may further include any of the componentry and functionality of the security sensor 422 and/or image capture device 500 discussed above with reference to FIGS. 4A and 4B. Accordingly, it will be understood that the sensor 702 may include components not shown in FIG. 7.

In one example, the motion detector 704 is a passive infrared (PIR) motion detector and the image capture device 706 is a digital camera. PIR sensors are motion sensors that detect changes in temperature over a pre-determined field of view. The PIR sensors can be configured with a threshold such that any change larger than the threshold constitutes motion and causes the sensor to take some further action, such as issuing an alert or activating one or more other sensors, as discussed below. The image capture device 706 collects still image frames and/or video image frames constituting a video feed/stream. The image capture device 706 may include the image sensor assembly 450 discussed above with reference to FIG. 4B. In one example, the controller 700 includes a neural processing unit (NPU) 708 for efficiently running neural networks to perform aspects of an adaptive motion detection process based on the image frames captured by the image capture device 706, as discussed in more detail below. In examples, the sensor 702 is a battery-powered indoor sensor configured to be installed and operated in an indoor environment, such as within a home, office, store, or other commercial or residential building, for example. In other examples, the sensor 702 may be configured to be installed and operated in an outdoor environment.

In examples, the sensor 702 is capable of detecting, and distinguishing between, certain objects, such as people, for example, in the image frames captured by the image capture device 706, and can be configured to trigger an object detection alert if an object of interest is identified. The sensor 702 can use any of a variety of techniques to locate and recognize objects in an image frame. For example, computer vision based object detection can use specialized filters for locating different attributes or features within an image frame and then combining the features to classify whether or not a particular category of object is found. For example, an object detector can locate all human faces in a frame. In some examples, the NPU 708 can be configured to implement machine learning based approaches are used wherein algorithms or models are trained on a vast number of images containing objects of interest to recognize similar objects in new or previously unseen images. In addition, examples of the sensor 702 are configured to detect motion relative to recognized objects. Motion detection is the process of detecting a change in position of an object relative to its surroundings or the change in the surroundings relative to an object. As discussed in more detail below, motion detection based on image processing can be performed by computing the pixel-to-pixel difference in intensity between consecutive frames to create a "difference image" and then applying a constant threshold to the difference image. Any difference values larger than the threshold constitute motion.

According to certain examples, the controller 700 and the motion detector 704 operate in a low power state (operating mode) in which the image capture device 706 (and optionally other components of the sensor 702) are deactivated, until an event triggers the motion detector 704. In the low power operating mode, the motion detector 704 remains active, but components that generally consume more power, such as the image capture device 706, for example, are powered off. In the low power operating mode, the controller 700 performs minimal processing, sufficient to monitor for events that trigger the motion detector 704. When the motion detector 704 indicates motion and issues a signal or notification (e.g., sends a motion trigger report to the controller 700), the controller 700 is placed into a normal operating mode, in which the image capture device 706 (along with any other components of the sensor 702 that are powered off in the low power state) is enabled. Thus, the motion detector 704 acts as a mode "switch" that configures the sensor 702 into the "full power" or normal operating mode only when necessary. In this manner, power can be conserved by operating the sensor 702 in the low power mode, with various components powered off, until a potential event of interest is detected. As discussed above, in certain examples the motion detector 704 is a PIR sensor that detects motion based on detected changes in temperature over its field of view. Accordingly, in some examples, the motion sensor 704 can be tuned to detect people and/or animals based on a known temperature range associated with the body temperatures of people/animals.

Once active, the image capture device 706 captures one or more frames of image data. In some examples, the image capture device 706 passes the frame(s) of image data ("images" or "image frames") to the controller 700 for processing. In examples, the controller 700 applies a motion detection process to the captured image frames to detect moving objects, which may then be identified as either objects of interest (e.g., people), detection of which may cause the sensor 702 to issue an alert, or benign objects that can be safely ignored.

As discussed above, when the image capture device 706 is activated, it may perform a series of automatic exposure adjustments to adapt to current lighting conditions so as to be able to capture well-exposed images (e.g., images that have balanced brightness etc., and that are not over- or under-exposed). These exposure adjustments can cause large variations in the image brightness, or intensity of the light at pixels in the image (referred to as pixel intensity), between successive frames of image data captured by the image capture device 706. In examples, the automatic exposure adjustments are performed over approximately 5 or 6 image frames captured by the image capture device 706 and takes approximately 125-200 milliseconds. As discussed above, in certain examples, a motion detection process operates by evaluating pixel intensity differences between successive image frames using a threshold (e.g., a constant difference value threshold). In such examples, the variations in pixel intensities caused by automatic exposure adjustments can trigger false positive instances of motion detection. Accordingly, aspects and examples address this problem by using a threshold (e.g., an adaptive differencing threshold) based on the distribution of pixel intensities in the difference image, as discussed in more detail below. Examples recognize and leverage that automatic exposure adjustments manifest as nearly constant intensity biases applied to the difference image, and thus, a strategically computed threshold can negate the effects of these adjustments.

Figure 8:
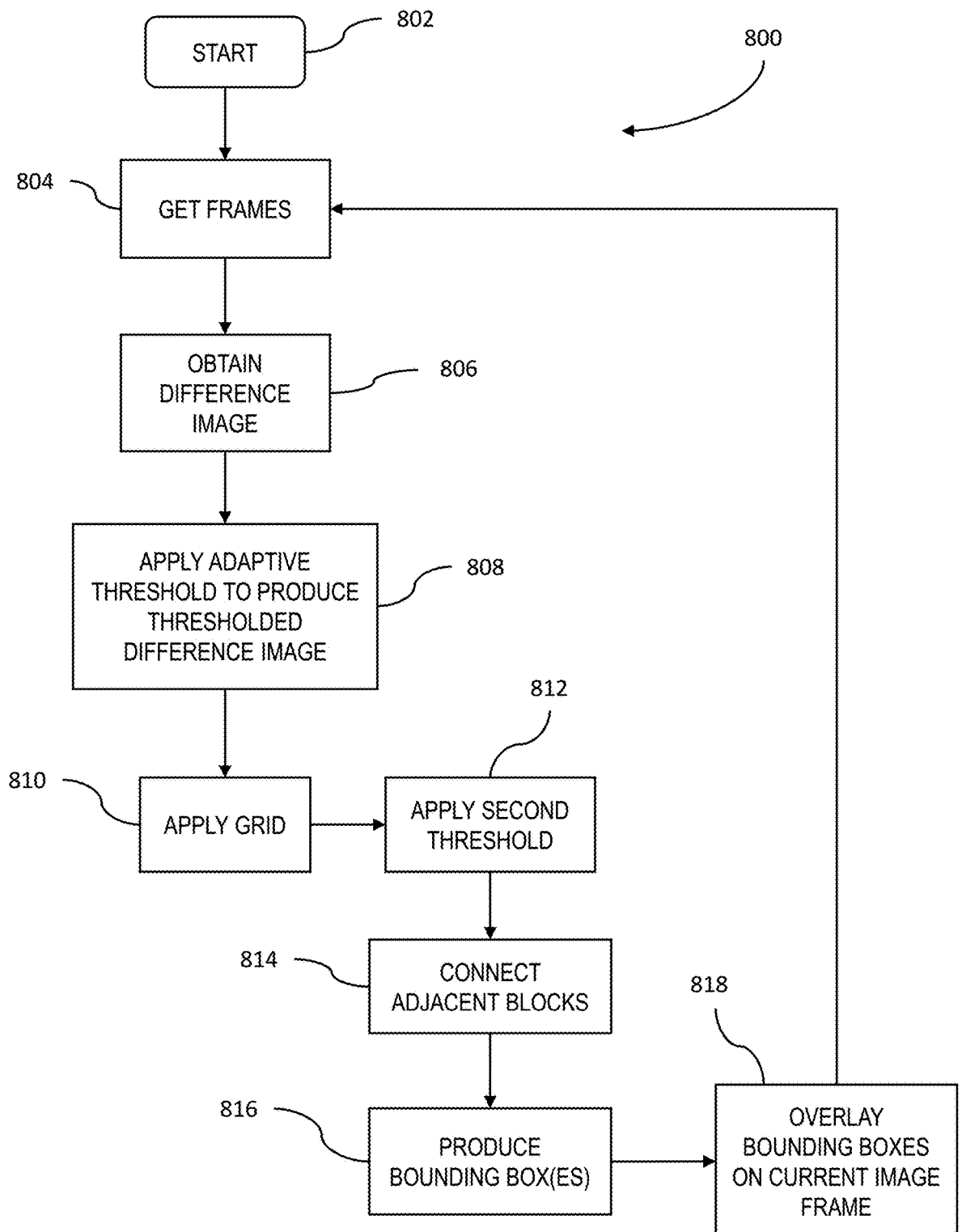
FIG. 8 is a flow diagram illustrating an example of a motion detection process that can be performed by a security sensor of FIG. 7 according to some examples described herein.

Referring to FIG. 8, there is illustrated a flow diagram of one example of a motion detection process 800 that can be implemented by the sensor 702. The process 800 begins at 802 when the image capture device 706 is activated. As discussed above, in examples, the image capture device 706 can be activated based on a motion event detected by the motion sensor 704; however, in other examples, the image capture device 706 can be activated based on one or more other triggers, information, events, or reasons. Once activated, at 804, the image capture device 706 captures images of a viewed scene.

At 806, the process 800 includes obtaining a difference image based on consecutive frames of image data captured at 804. In examples, the image capture device 706 is configured to obtain color images of the viewed scene. In some such examples, obtaining the difference image at 806 includes converting at least some of the image frames captured at 804 to greyscale, so as to produce at least two consecutive greyscale image frames that can be compared to produce the difference image. An advantage to using greyscale images is that variations in brightness that are due to color settings (and not related to motion), or other offsets and/or errors due to color can be removed from the images prior to further processing. In addition to converting the images to greyscale, in some examples, the images are also resized for motion detection. In one example, the greyscale frame is resized to 320×192 pixels for motion detection; however, in other examples, other frame sizes can be used. In some instances, the image capture device may capture images that have significantly larger size (higher resolution); however, this resolution may not be needed for sufficiently accurate motion detection for the purpose/application of the sensor 702. Larger images represent more data, and thus may require more time and/or processing power to be processed to detect motion. Accordingly, the images can be downsized so as to reduce the amount of time taken and/or the computing resources needed to apply the motion detection processes discussed herein.

Figure 9A:
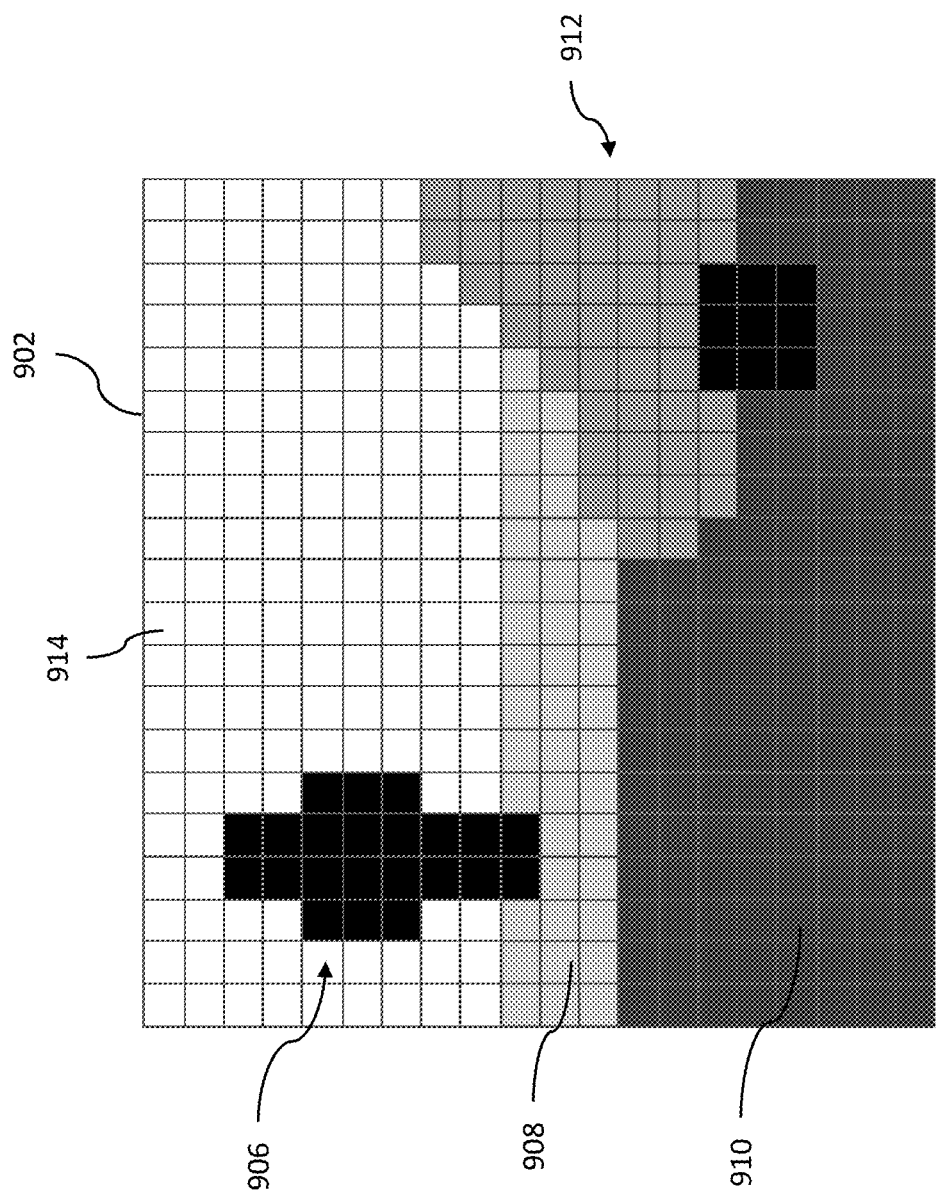
FIG. 9A is a diagram of one example of an image of a scene according to some examples described herein.
Figure 9B:
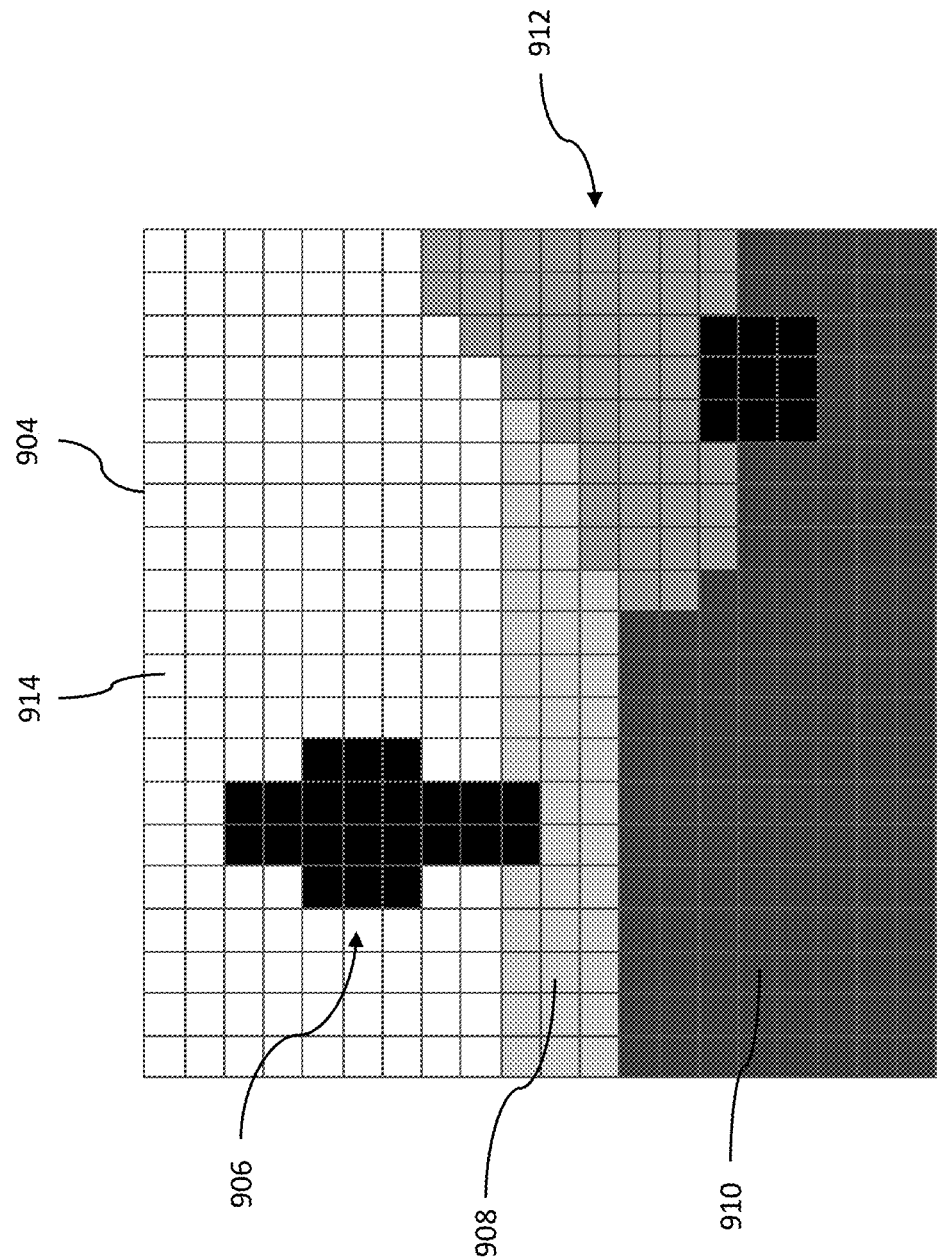
FIG. 9B is a diagram of an example of another image of the scene according to some examples described herein.

FIGS. 9A and 9B illustrate examples of a first greyscale image (FIG. 9A) and a second, subsequently captured, greyscale image (FIG. 9B) of a scene. For the purposes of the following discussion, the first image 902 is referred to as the "previous image frame" or "previous frame" and the second image 904 is referred to as the "current image frame" or "current frame. In the illustrated example, the images include a person 906 walking on a sidewalk 908 along a street 910. A car 912 parked on the street 910 is also visible in the images. Each image 902, 904 is made up of a plurality of pixels 914. In the illustrated example, each image is 20×20 pixels 914; however, it will be appreciated that in practice the images may include thousands of pixels or more. As may be seen by comparing FIGS. 9A and 9B, in the current image frame of FIG. 9B, the person 906 has moved two pixels to the right relative to their location in the previous image frame of FIG. 9A. The background in the image frames has not changed. Thus, the motion detection process may detect the motion of the person 906 relative to the unchanged background, as discussed further below.

Figure 10A:
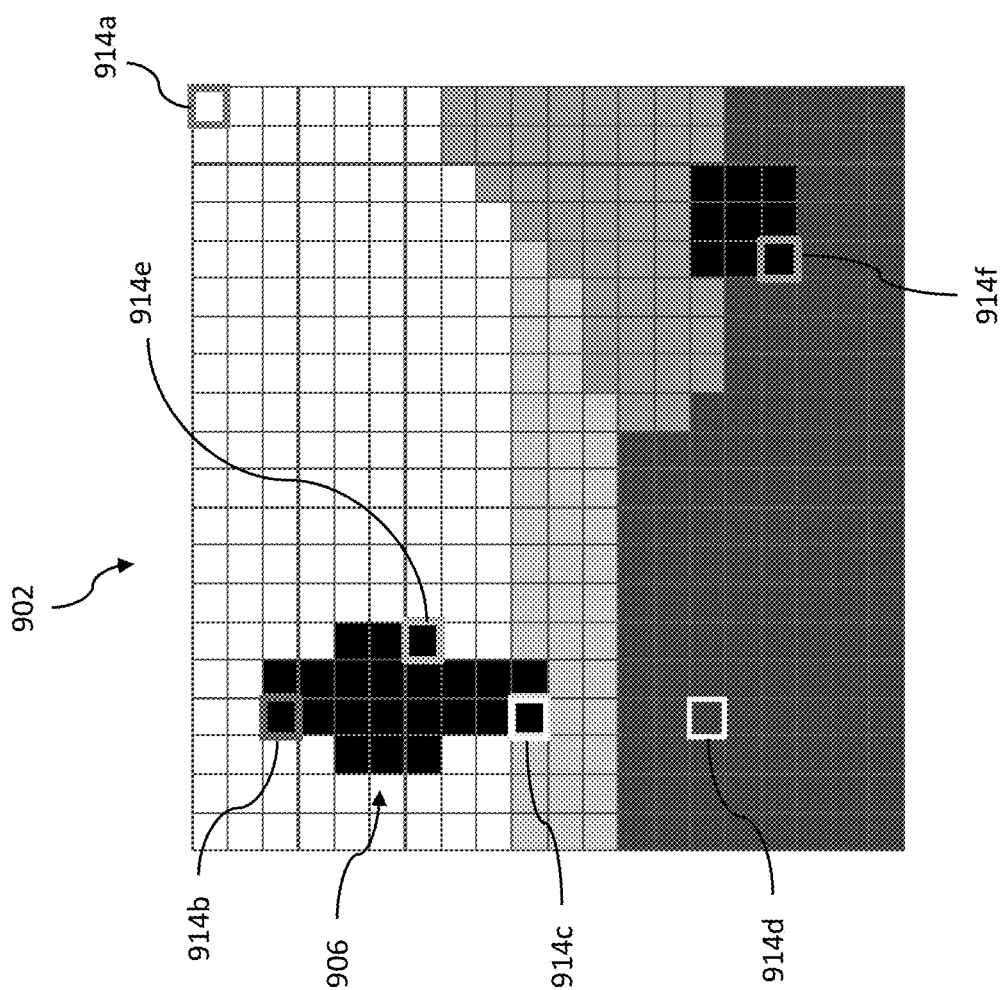
FIG. 10A is a diagram highlighting certain pixels of the image of FIG. 9A according to some examples described herein.
Figure 10B:
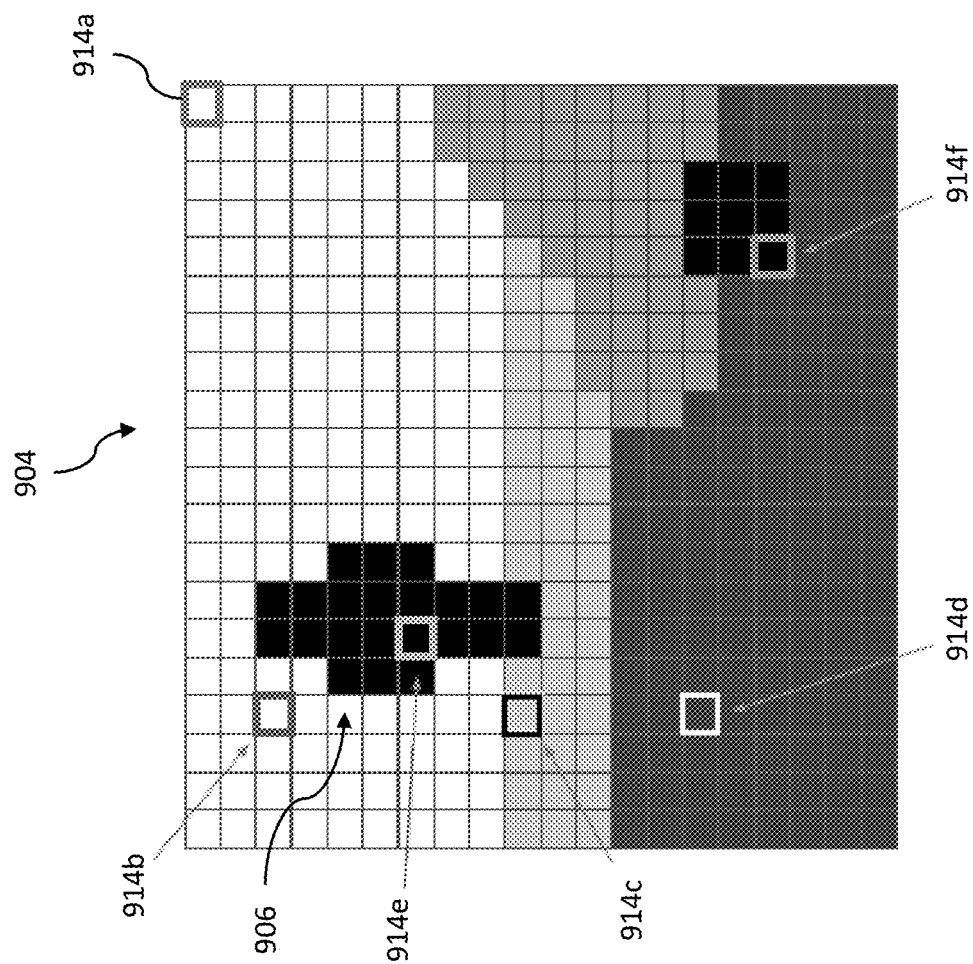
FIG. 10B is a diagram highlighting certain pixels of the image of FIG. 9B according to some examples described herein.

In examples, the differencing process includes comparing the current image frame 904 with the previous image frame 902, pixel to pixel, to determine differences in the pixel intensities between the two frames. FIGS. 10A and 10B illustrate copies of the images 902, 904 of FIGS. 9A and 9B, respectively, highlighting a plurality of compared pixels 914*a-f*, for example. As may be seen by comparing FIGS. 10A and 10B, the intensities of the pixels 914*a*, 914*d*, 914*e*, and 914*f* have not changed from the previous image frame 902 to the current image frame 904. However, the movement of the person 906 results in changes in intensities of the pixels 914*b* and 914*c*. Further, it can be seen that the change in intensity at pixel 914*b* is different than the change in intensity at pixel 914*c* due to the difference in brightness of the background relative to the person 906 at these two pixel locations.

In examples, the differencing process at 806 includes computing a difference in pixel intensity (e.g., an absolute difference) between the current image frame 904 and the previous image frame 902 and producing a difference image 916, an example of which is shown in FIG. 11. The difference image 916 records the magnitude of the change in pixel intensity for individual pixels 914. Thus, the intensity of individual pixels in the difference image 916 corresponds to the magnitude of the change in intensity of that pixel from the previous image frame 902 to the current image frame 904. Referring to FIGS. 9A and 9B, it can be seen that there is no change in pixel intensity at the majority of the pixels, as is reflected in the difference image 916 where most of the pixels have an intensity value of zero. As discussed above, some pixels change more than others due to differences in the background as the person 906 moves. In the example illustrated in FIG. 11, some non-zero pixels in the difference image 916 have an intensity of 250, and others of 150; however, it will be appreciated that these numbers are arbitrary and used for the purpose of illustration only.

To identify motion, a threshold is applied to the difference image, with intensity differences above the threshold being associated with motion. In examples, the difference image is filtered based on the threshold to produce a filtered image in which the intensity values of the pixels are determined based on whether or not corresponding pixels in the difference image have intensity values above or below the threshold, as discussed further below. Thresholding filters out small changes in pixel intensities from frame to frame which can occur due to noise or accuracy/resolution limits in the image capture device 706, variations in lighting, or other events that are not necessarily related to motion, particularly to motion of objects of interest.

Figure 12A:
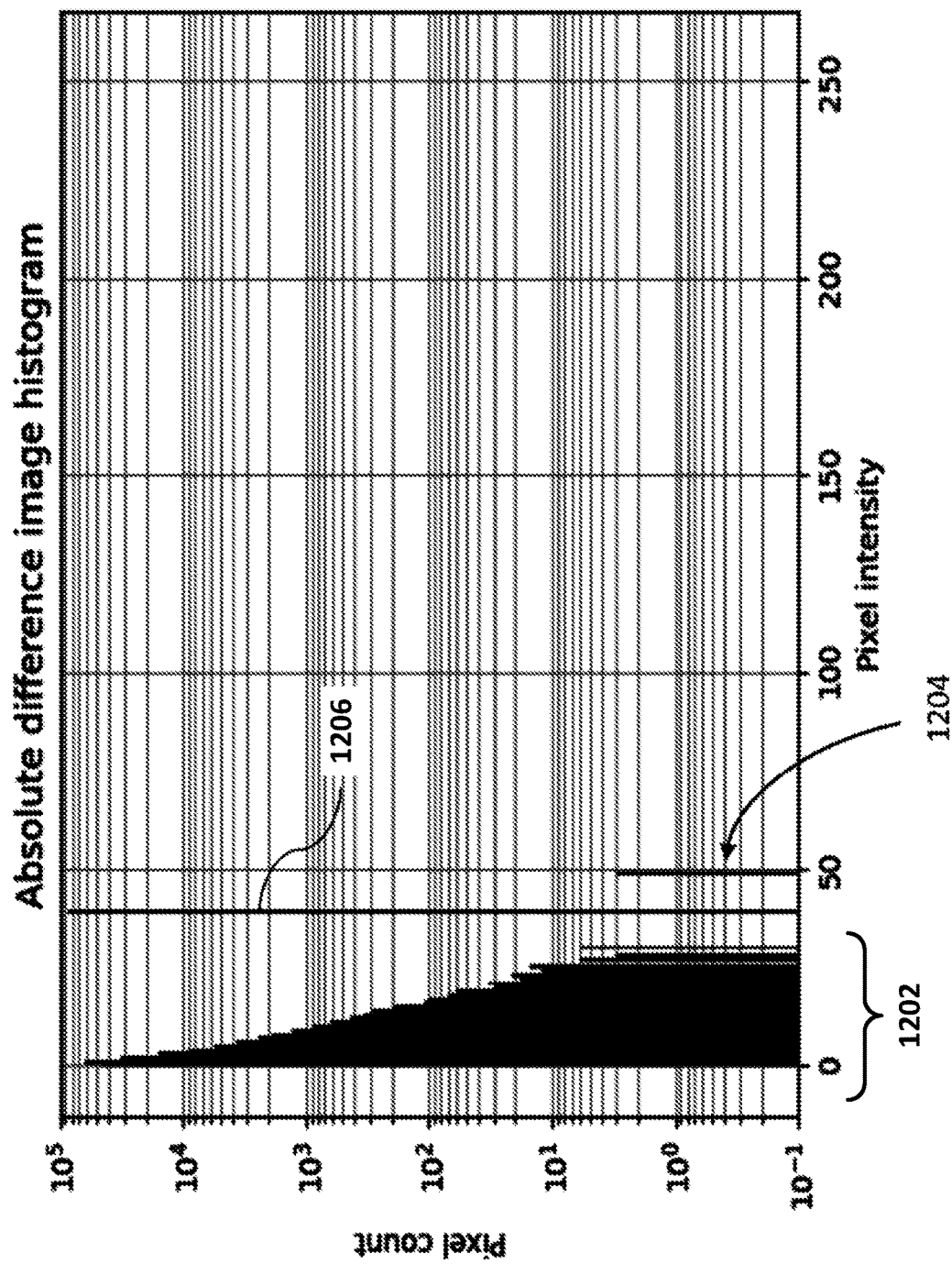
FIG. 12A is a graph showing an example of a difference histogram for a difference image according to some examples described herein.

The pixel intensities of the difference image can be visualized in graphical form as a histogram. For example, FIG. 12A illustrates an example of a histogram of a difference image (difference histogram) showing the number of pixels (vertical axis) having each intensity value (horizontal axis). The difference histogram represents the distribution of pixel intensities, where high pixel intensities represent a larger change in pixel value between consecutive frames, and vice versa. Therefore, high pixel intensities are generally indicators of motion between frames. In the example of FIG. 12A, it can be seen that many pixels have low intensities, indicated by the group of lines 1202, which represent small variations as may be caused by noise and other factors as discussed above. A clear separation can be seen between the group of pixel intensity values 1202 and pixel intensity value 1204 representing or otherwise indicative of a motion event. Thus, in this case, use of a fixed intensity threshold of 40, for example, (indicated at 1206 in FIG. 12A) would accurately detect motion, since (as may be seen in FIG. 12A) only the motion-based intensity value 1204 is above the threshold 1206.

Figure 12B:
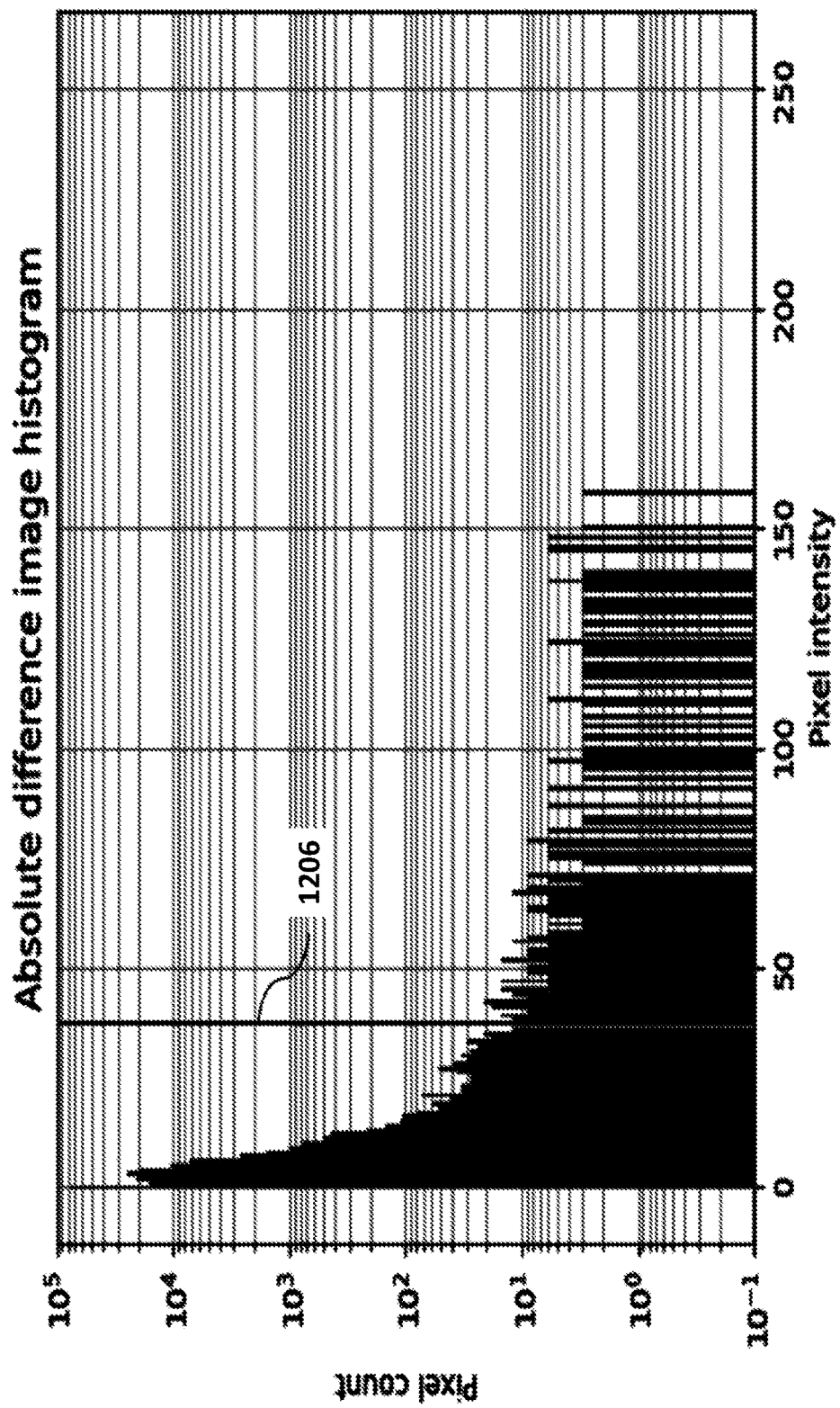
FIG. 12B is a graph showing another example of a difference histogram based on images acquired while a camera is performing automatic exposure adjustment according to some examples described herein.

The histogram of FIG. 12A illustrates to an example in which the camera is in a stable state (capturing well-exposed images) and not undergoing automatic exposure adjustments. FIG. 12B illustrates a corresponding example in which the camera is performing automatic exposure adjustments during the time period in which the two images used to produce the difference image are captured. As can be seen by comparing FIGS. 12A and 12B, in this case, the changes in pixel intensities of the difference histogram (FIG. 12B) is far more spread out over a greater range of pixel intensities, and the pixel intensity value 1204 clearly visible in FIG. 12A is not visually distinguishable from other pixel intensity values shown in FIG. 12B. In the case of FIG. 12B, the fixed intensity threshold of 40 (indicated at 1206), for example, would potentially detect motion (such as the motion event corresponding to the pixel intensity value 1204 in FIG. 12A), but would also result in false positive motion detections corresponding to the numerous pixels with intensities above a threshold of 40. Setting the fixed threshold at a value high enough to avoid false positive motion detections during the adjustment phase of the camera would cause the sensor to potentially miss genuine motion events (e.g., motion indicated by pixel intensity value 1204), leading to a lack of reliability in threat detection.

Referring again to FIG. 8, according to certain examples, to overcome the thresholding limitations discussed above, the process 800 includes applying an adaptive threshold at 808 to produce a filtered image (also referred to as a thresholded difference image) in which intensity values of individual pixels are determined based on the adaptive threshold. Thus, rather than using a fixed, predetermined threshold, at 808 examples of the process 800 calculate an adaptive or dynamic threshold value based on the difference image obtained at 806. As discussed above, exposure adjustments by the image capture device 706 manifest as nearly constant intensity biases in the difference image, and therefore, by basing the threshold value on the difference image itself, the effects of these adjustments can be negated without compromising the ability of the sensor 702 to reliably detect motion events.

Figure 13:
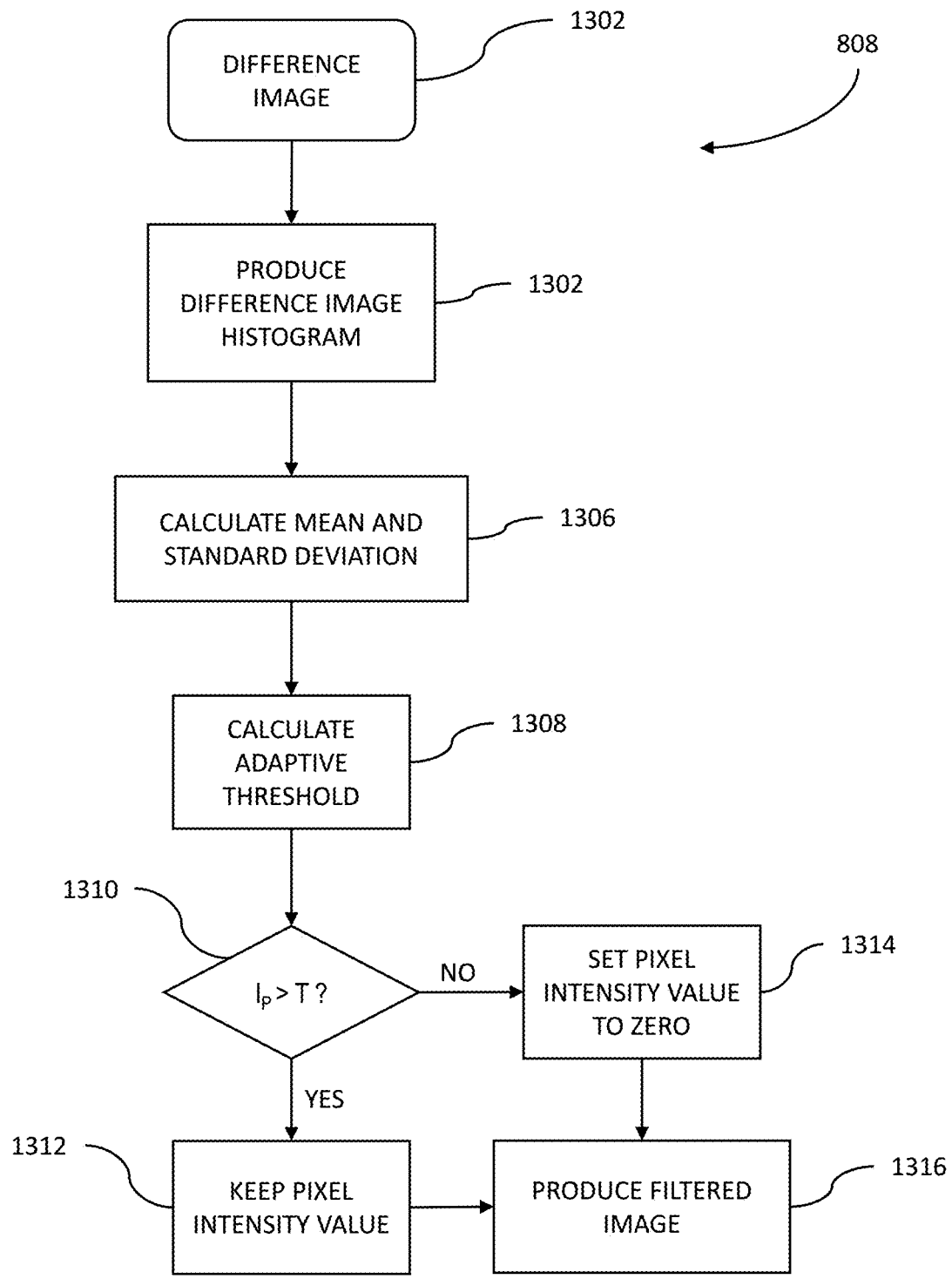
FIG. 13 is a flow diagram of one example of a process of determining and applying an adaptive threshold to a difference image according to some examples described herein.
Figure 14:
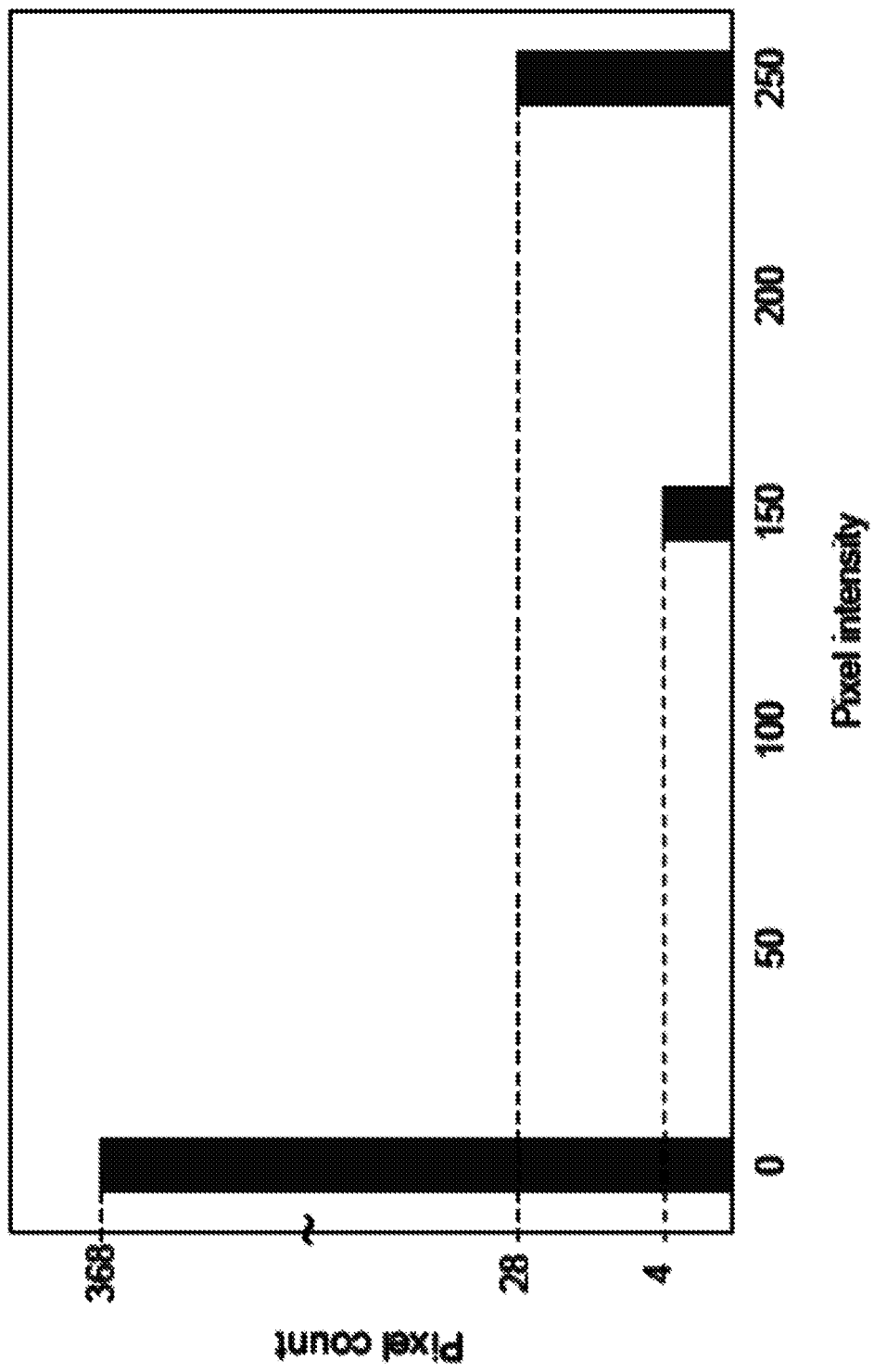
FIG. 14 is a graph illustrating a difference histogram corresponding to the example difference image of FIG. 11 according to some examples described herein.

FIG. 13 illustrates a flow diagram of one example of the process 808. The process 808 begins at 1302 with the difference image obtained at 806, as discussed above. At 1304, a data set corresponding to the current difference image obtained at 806, is assembled. The data set includes the intensity values represented in the difference image and the number of pixels in the difference image having an intensity value associated therewith. As discussed above with reference to FIGS. 12A and 12B, this data set can be visualized as a histogram. In examples, the process 808 computes the adaptive threshold value T according to the following formula:

$$T = m\mu + n\sigma \quad (1)$$

In Equation (1), μ is the mean of the data set, σ is the standard deviation of the data set, and m and n are empirical constants. Thus, at 1306, the process 808 includes calculating the mean and standard deviation for the data set assembled at 1304. The threshold, T, is then calculated at 1308 according to Equation (1). In examples, the values of the constants m and n are determined based on analysis of a large set of data and can be programmed in the firmware of the sensor 702. Thus, the constants m and n can be set and not updated or set and changed during the process 800, whereas the values of μ and σ are calculated at 1306 during performance of the process 808. In some examples, m is given a value of 1 and n is given a value in a range of 3-5.

Returning to the example of FIGS. 9A-11, FIG. 14 illustrates a histogram corresponding to the difference image 916 of FIG. 11. In this example, the mean, μ, is calculated according to Equation (2) below, and the standard deviation is σ=65.11.

$$\mu = (0*368 + 4*150 + 28*250)/400 = 19 \quad (2)$$

Thus, for this example, the threshold, T, calculated according to Equation (1) and rounded to the nearest whole number, using values m=1 and n=3, is given by:

$$T = 1*19 + 3*65.11 = 214$$

Referring to the examples of FIGS. 12A and 12B, the mean and standard deviation for the data set represented by the histogram of FIG. 12A are much lower than those of the data set represented by the histogram of FIG. 12B. As discussed above, the difference histograms represent the distribution of pixel intensities, where high pixel intensities represent a larger change in pixel value between consecutive frames, and vice versa. During automatic exposure adjustments, there is an overall increase in brightness to the difference image, thus right-shifting the histogram and increasing the mean of the distribution. Applying the above-discussed approach of adaptive thresholding to the examples of FIGS. 12A and 12B (using a mean and standard deviation calculated for the data sets represented in these figures) would therefore result in a higher threshold value being calculated and applied in the example of FIG. 12B than in the example of FIG. 12A, which would advantageously result in the filtering out of at least some intensity differences caused by the automatic exposure adjustments. In addition, by calculating the threshold, T, based on characteristics of the difference image itself, the process 808 can become very sensitive to motion, allowing the motion detection process 800 to operate well even in low-light conditions.

Referring again to FIG. 13, examples of the process 808 apply the determined threshold value to the difference image. In examples, the process 808 includes determining, for individual pixels in the difference image, whether or not the pixel intensity ($I_P$) is above the threshold value, as indicated at decision block 1310. If the pixel intensity exceeds the threshold value, that pixel retains its current intensity value, as indicated at 1312. If the pixel intensity does not exceed the threshold value (i.e., the pixel intensity is at or below the threshold value), that pixel is set to an intensity value of zero as indicated at 1314 or otherwise disregarded (or not considered) for purposes of producing a thresholded (or filtered) difference image. The pixel values from 1312 and 1314 are then used to produce a filtered image at 1316.

Figure 15:
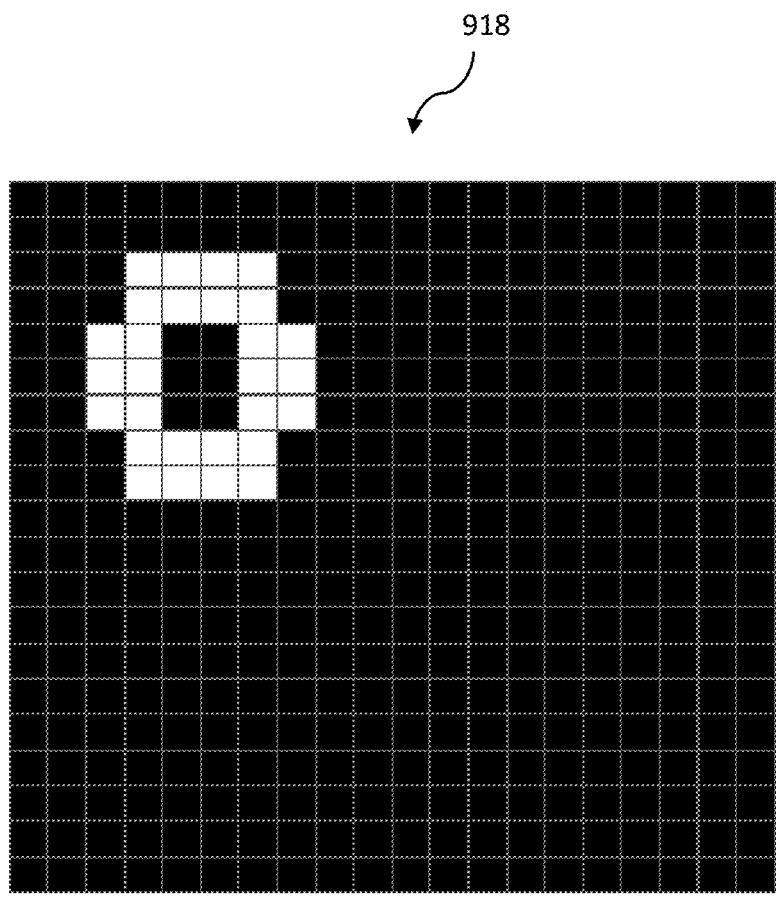
FIG. 15 is a diagram illustrating an example of a filtered image corresponding to the difference image of FIG. 11 according to some examples described herein.

FIG. 15 illustrates an example of a filtered image 918 corresponding to the example of FIGS. 9A-11 and 14. In other words, the filtered image 918 shown in FIG. 15 is produced from the difference image 916 of FIG. 11 with the threshold value of 214 calculated above applied. As may be seen by comparing FIGS. 11 and 15, in the filtered image 918, the pixels having intensity values greater than 214 (shown as white pixels in FIG. 15) retain the same intensity values that they have in the difference image 916, whereas all other pixels (shown as black pixels in FIG. 15) are set to zero. For example, the pixels having intensity values of 150 in the difference image 916 of FIG. 11 now have intensity values of zero in the filtered image 918.

In some examples of the process 800, regions of motion may be identified based on the filtered image 918. In some examples, the system may be configured to indicate one or more regions of motion based on the non-zero pixels in the filtered image 918 (e.g., white pixels in FIG. 15). For example, non-zero pixels, or groups of adjacent non-zero pixels, may be identified as motion. In other examples, additional processing may be applied to the filtered image 918 to identify regions of motion, as illustrated in FIG. 8.

Figure 16:
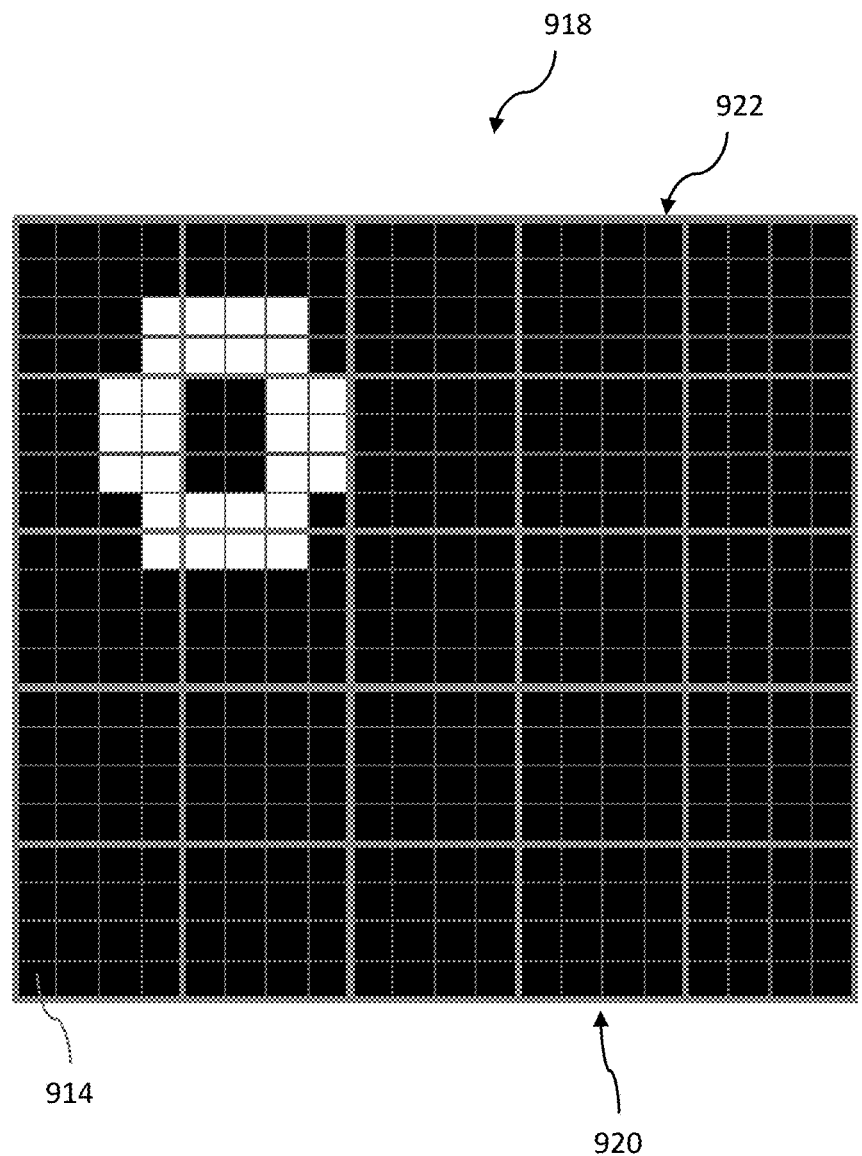
FIG. 16 is a diagram showing an example of a grid applied to the filtered image of FIG. 15 according to some examples described herein.
Figures 17A, 17B:
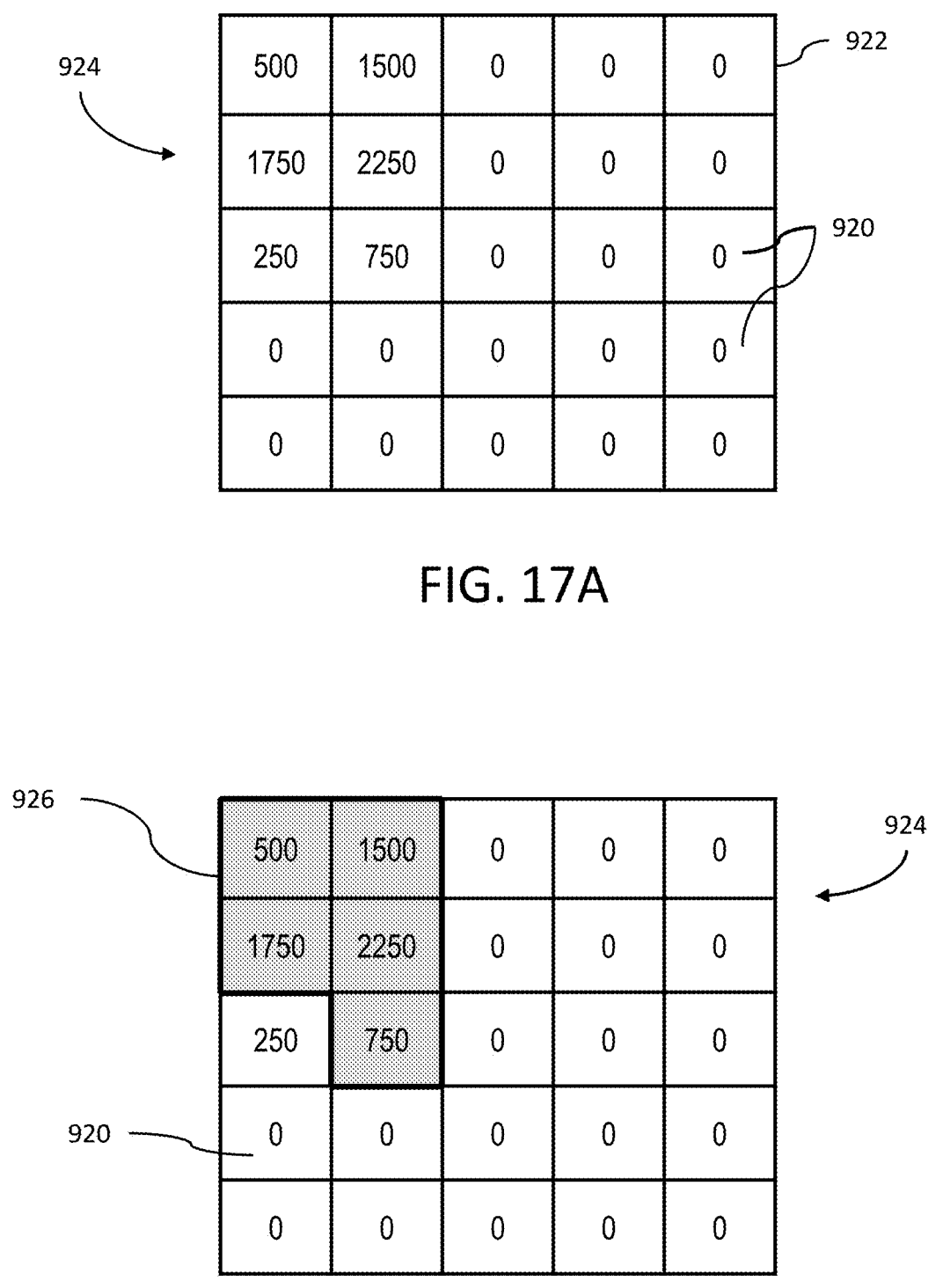

Accordingly, returning to FIG. 8, at 810, the filtered image 918 may be divided into a plurality of blocks 920 according to a grid 922 overlaid on the filtered image, as shown in FIG. 16. In the illustrated example, individual blocks 920 in the grid 922 is made up of 4×4 pixels 914. However, in other examples, the blocks 920 may have different sizes, for example, 8×8 pixels, 16×16 pixels, or some other size or shape. In examples, the pixel intensity values of all the pixels in individual blocks 920 are summed to produce a summed grid, as shown in FIG. 17A, for example. The summed grid 924 shown in FIG. 17A corresponds to example shown in FIGS. 11, 15, and 16. The values in individual blocks 920 of the summed grid 924 correspond to the sum of all the pixel intensities in that block.

At 812, examples of the process 800 include applying a second threshold to the summed grid obtained at 810. Blocks 920 having a value that exceeds the second threshold are considered to contain motion and are retained, whereas blocks having a value at or below the second threshold are ignored. In examples, the second threshold has a fixed value. The second threshold is used to filter out noise or motion corresponding to very small objects, for example. In some examples, the adaptive threshold, T, calculated at 1308 can approach zero; however, the second threshold value applied at 812 can filter out noise that may have passed the threshold T. Thus, in examples where the adaptive threshold, T, is very low (very sensitive for motion detection), the second threshold can remove noise and small motion. Small moving objects can result in high pixel intensities in the difference image over a small number of pixels. Because the second threshold is applied to the summed grid 924, which sums the values of all pixels 914 grouped into individual blocks 920, the effect of such small moving objects is reduced. For example, if a few pixels in a block have high intensity values due to a small moving object, but the remainder of the pixels in the block have low intensity values, the overall value for the block may still fall below the second threshold. Thus, the small moving object (which generally may not constitute a threat) can be filtered out. In contrast, large moving objects, such as people, vehicles or large animals, may cause high pixel intensity values over a large number of pixels within one or more blocks. Thus, those blocks may have values that exceed the second threshold, resulting in detection of the motion of the large object.

Still referring to FIG. 8, at 814, an analysis may be applied to connect adjacent remaining blocks to form one or more connected regions, as shown in FIG. 17A, for example. In examples, blocks 920 are connected at 814 if they have combined/summed intensity values (e.g., the sum of the intensity values of all pixels included in an individual block 920) that exceed the second threshold and share at least one common boundary. In the example shown in FIG. 17B, a second threshold value of 300 was applied to the summed grid 924 of FIG. 17A. Blocks having a combined intensity value less than 300 are omitted from further analysis. The remaining blocks 920 (shown shaded in FIG. 17B) are adjacent and are thus connected to form connected region of interest 926. Connected regions are recognized to indicate regions of motion. Accordingly, at 816, one or more bounding boxes are produced, individual bounding boxes correspond to, defining, or otherwise being inclusive of one connected region. In examples, the bounding boxes are rectangular, rather than following precisely the shape of the corresponding connected regions, but need not be the case in all instances.

Figure 18:
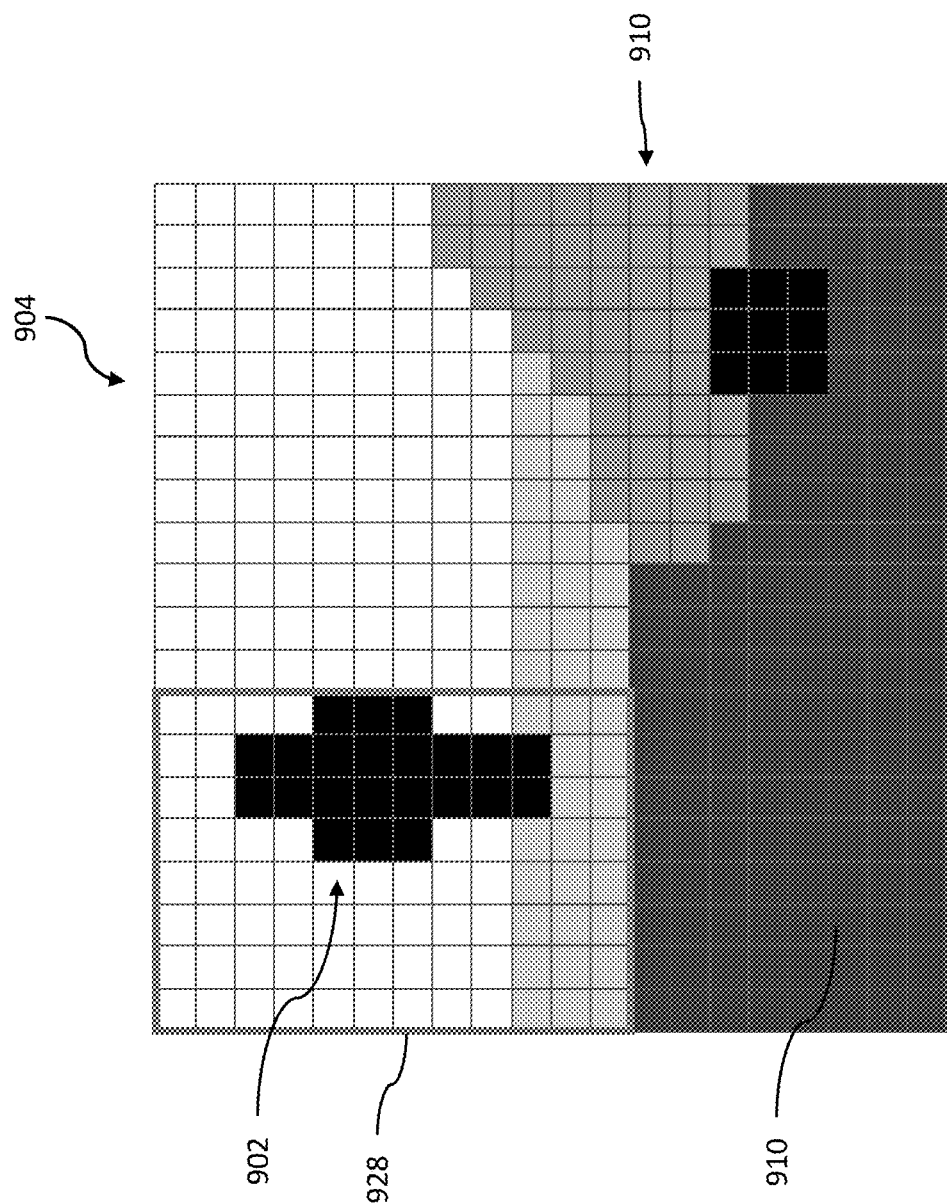
FIG. 18 is a diagram illustrating an example of a motion detection bounding box overlaid on the image of FIG. 9B according to some examples described herein.

The bounding box or boxes produced at 816 may then be overlaid on the current image frame (as indicated at 818) to indicate where in the image frame instances of motion have been detected. For example, referring to FIG. 18, a bounding box 928 corresponding to the connected region 926 of FIG. 17B is shown overlaid on the current image frame 904. As shown, and referring also to FIGS. 9A and 9B, the bounding box 928 correctly identifies the region of the image where the motion corresponding to the person 906 moving along the sidewalk 910 occurs. As discussed above, the sensor 702 may take various actions based on detecting motion. For example, the sensor 702 may trigger an alarm based on detected motion. In examples, the sensor 702 may identify objects associated with the detected motion as moving objects which may then be classified as either objects of interest (e.g., people), detection of which may cause the sensor 702 to issue an alarm, or benign objects that can be safely ignored.

As shown in FIG. 8, the process 800 may then continue and repeat as the image capture device 706 continues to capture more image frames at 804. In examples, the process 800 repeats until the image capture device 706 is deactivated and the sensor 702 returns to the low-power mode of operation.

Thus, aspects and examples provide systems and methods that can improve the reliability of, and user experiences with, monitoring security systems. As discussed above, examples include applying an adaptive or dynamic threshold to difference images to detect motion. The use of an adaptive threshold, as described herein, can reduce false positive motion detection caused by automatic exposure adjustments and improve true positive motion detection during automatic exposure adjustments. In addition, the need to delay motion detection until a well-exposed image is achieved can be eliminated by using the processes disclosed herein. Examples of the processes disclosed herein can be used to improve the accuracy of motion detection bounding boxes made by the sensor 702. As discussed above, examples of the processes and techniques disclosed herein help to ensure that the sensor detects only the motion caused by moving objects, and also allow motion detection to begin sooner because the processes and techniques do not depend on having well-exposed images. The sensor 702 can therefore make the decision to alert the user (based on detected motion) more quickly, thus conserving battery life by reducing the amount of time for which the image capture device 706 needs to remain active and recording images. In addition, as also discussed above, examples provide more accurate motion detection that can distinguish between a large moving object and a small moving object. Accordingly, the sensor 702 can be configured to ignore small moving objects which are considered safe from a security standpoint.

Figure 19:
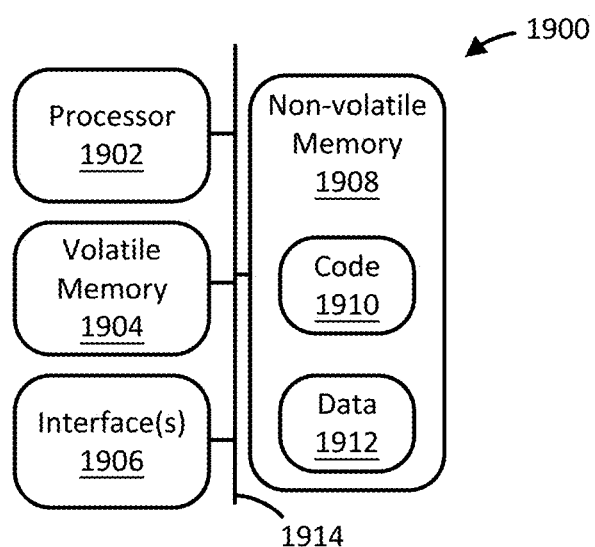
FIG. 19 is a schematic diagram of a computing device, according to some examples described herein.

Turning now to FIG. 19, a computing device 1900 is illustrated schematically. As shown in FIG. 19, the computing device includes at least one processor 1902, volatile memory 1904, one or more interfaces 1906, non-volatile memory 1908, and an interconnection mechanism 1914. The non-volatile memory 1908 includes code 1910 and at least one data store 1912.

In some examples, the non-volatile (non-transitory) memory 1908 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 1910 stored in the non-volatile memory can include an operating system and one or more applications or programs that are configured to execute under the operating system. Alternatively or additionally, the code 1910 can include specialized firmware and embedded software that is executable without dependence upon a commercially available operating system. Regardless, execution of the code 1910 can result in manipulated data that may be stored in the data store 1912 as one or more data structures. The data structures may have fields that are associated through colocation in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

Continuing the example of FIG. 19, the processor 1902 can be one or more programmable processors to execute one or more executable instructions, such as a computer program specified by the code 1910, to control the operations of the computing device 1900. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 1904) and executed by the circuitry. In some examples, the processor 1902 is a digital processor, but the processor 1902 can be analog, digital, or mixed. As such, the processor 1902 can execute the function, operation, or sequence of operations using digital values and/or using analog signals. In some examples, the processor 1902 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 1902 that are multicore can provide functionality for parallel, simultaneous execution of instructions or for parallel, simultaneous execution of one instruction on more than one piece of data.

Continuing with the example of FIG. 19, prior to execution of the code 1910 the processor 1902 can copy the code 1910 from the non-volatile memory 1908 to the volatile memory 1904. In some examples, the volatile memory 1904 includes one or more static or dynamic random access memory (RAM) chips and/or cache memory (e.g. memory disposed on a silicon die of the processor 1902). Volatile memory 1904 can offer a faster response time than a main memory, such as the non-volatile memory 1908.

Through execution of the code 1910, the processor 1902 can control operation of the interfaces 1906. The interfaces 1906 can include network interfaces. These network interfaces can include one or more physical interfaces (e.g., a radio, an ethernet port, a USB port, etc.) and a software stack including drivers and/or other code 1910 that is configured to communicate with the one or more physical interfaces to support one or more LAN, PAN, and/or WAN standard communication protocols. The communication protocols can include, for example, TCP and UDP among others. As such, the network interfaces enable the computing device 1900 to access and communicate with other computing devices via a computer network.

The interfaces 1906 can include user interfaces. For instance, in some examples, the user interfaces include user input and/or output devices (e.g., a keyboard, a mouse, a touchscreen, a display, a speaker, a camera, an accelerometer, a biometric scanner, an environmental sensor, etc.) and a software stack including drivers and/or other code 1910 that is configured to communicate with the user input and/or output devices. As such, the user interfaces enable the computing device 1900 to interact with users to receive input and/or render output. This rendered output can include, for instance, one or more GUIs including one or more controls configured to display output and/or receive input. The input can specify values to be stored in the data store 1912. The output can indicate values stored in the data store 1912.

Continuing with the example of FIG. 19, the various features of the computing device 1900 described above can communicate with one another via the interconnection mechanism 1914. In some examples, the interconnection mechanism 1914 includes a communications bus.

Various inventive concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

ADDITIONAL EXAMPLES

Example 1 provides a method comprising producing a first image based on a plurality of previous images that form part of a sequence of images, the first image including pixels with intensity values that approximate a difference in intensity values between a pair of pixels the previous images, and the pair of pixels being one pixel from each of first and second previous images and present at the same locations within their respective images, generating a second image by applying a threshold to the first image, the second image including one or more pixels with intensity values above the threshold, and the threshold being derived from intensity values of pixels within the first image and a number of pixels in the first image with a respective intensity value, and determining a region of the second image indicative of motion based on a location of the one or more pixels in the second image.

Example 2 includes the method of Example 1, further comprising acquiring the plurality of previous images using a camera.

Example 3 includes the method of Example 2, further comprising detecting a motion event in a scene using a motion detector, and based on detecting the motion event, activating the camera to acquire the plurality of images.

Example 4 includes the method of any one of Examples 1-3, further comprising determining the first threshold by assembling a data set corresponding to the first image, the data set specifying the intensity values of pixels within the first image and the number of pixels in the first image with the respective intensity value, calculating a mean of the data set and a standard deviation for the data set, and determining the first threshold based on the mean and the standard deviation.

Example 5 provides a security sensor comprising an image capture device, at least one processor, and a data storage device storing instructions that when executed by the at least one processor cause the security sensor to perform the method of any one of Examples 1-4.

Example 6 includes the security sensor of Example 5, further comprising a battery coupled to the motion detector, the image capture device, the data storage device, and the at least one processor.

Example 7 provides a method of motion detection comprising acquiring first and second images of a scene using an image capture device, producing a third image based on the first and second images, wherein a first intensity value of individual pixels in the third image corresponds to a magnitude of a difference in intensity between respective corresponding pixels in the first and second images, determining a first threshold based on the third image, applying the first threshold to the third image to produce a fourth image, wherein each pixel in the fourth image has a respective second intensity value, and wherein the second intensity value is determined based on whether or not the first intensity value of a corresponding pixel in the third image exceeds the first threshold, grouping pixels of the fourth image into a plurality of blocks, individual blocks including a plurality of the pixels of the fourth image, summing the second intensity values of the plurality of pixels in individual blocks to produce a summed value for the respective block, and identifying a region of motion in the second image based on two or more adjacent blocks in the fourth image having summed values that exceed a second threshold.

Example 8 includes the method of Example 7, wherein identifying the region of motion in the second image comprises producing a bounding box corresponding to the two or more adjacent blocks, and overlaying the at least one bounding box on the second image.

Example 9 includes the method of Example 8, wherein producing the bounding box comprises forming a connected region in the fourth image, the connected region including the two or more adjacent blocks, and producing the bounding box based at least in part on an outline of the connected region.

Example 10 includes the method of any one of Examples 7-9, wherein determining the first threshold comprises assembling a data set corresponding to the difference image, calculating a mean of the data set and a standard deviation for the data set, and determining the first threshold based on the mean and the standard deviation.

Example 11 includes the method of Example 10, wherein determining the first threshold includes determining the first threshold based on a sum of the mean multiplied by a first constant and the standard deviation multiplied by a second constant, wherein the first and second constants are empirically determined constants.

Example 12 includes the method of any one of Examples 7-11, wherein the second intensity value of each pixel in the fourth image is one of zero based on the first intensity value of the corresponding pixel in the third image being at or below the first threshold, or the first intensity value of the corresponding pixel in the third image based on the first intensity value of the corresponding pixel in the third image exceeding the first threshold.

Example 13 includes the method of any one of Examples 7-12, further comprising detecting a motion event in a scene using a motion detector, and based on detecting the motion event, activating the image capture device to acquire the first and second images.

Example 14 includes the method of any one of Examples 7-13, further comprising, prior to producing the third image, converting the first and second images to first and second greyscale images, respectively, wherein producing the third image includes producing the third image based on the first and second greyscale images.

Example 15 provides a method of motion detection comprising acquiring first and second images of a scene using an image capture device, producing a difference image based on the first and second images, the difference image comprising a first plurality of pixels, wherein individual first intensity values of respective pixels of the first plurality of pixels in the difference image correspond to a magnitude of a difference in intensity between respective corresponding pixels in the first and second images, determining a first threshold based on the difference image, filtering the difference image by applying the first threshold to produce a filtered image having a second plurality of pixels, wherein individual second intensity values of respective pixels of the second plurality of pixels in the filtered image are determined based on whether or not the first intensity value of a corresponding pixel in the third image exceeds the first threshold, dividing the filtered image into a plurality of blocks, individual blocks including a subset of pixels of the plurality of pixels of the filtered image, summing the second intensity values of the subset of pixels in individual blocks to produce a summed value for the respective block, and identifying a region of motion in the second image based on two or more adjacent blocks in the filtered image having summed values that exceed a second threshold.

Example 16 includes the method of Example 15, wherein determining the first threshold comprises assembling a data set corresponding to the difference image, the data set identifying the first intensity values and a number of pixels in the third difference image having each first intensity value, calculating a mean of the data set and a standard deviation for the data set, and determining the first threshold based on the mean and the standard deviation.

Example 17 includes the method of one of Examples 15 and 16 wherein the respective second intensity values of the second plurality of pixels in the filtered image are one of zero, or the first intensity value of the corresponding pixel in the difference image based on the first intensity value exceeding the first threshold.

Example 18 provides a security sensor comprising an image capture device, at least one processor, and a data storage device storing instructions that when executed by the at least one processor cause the security sensor to acquire first and second image frames using the image capture device, determine differences in pixel intensities between the first and second images, based on the differences, produce a third image, wherein a first intensity value of individual pixels in the third image corresponds to a magnitude of a difference in intensity between respective corresponding pixels in the first and second images, determine a first threshold based on the third image, produce a fourth image based on the first threshold, wherein each pixel in the fourth image has a respective second intensity value determined based on whether or not the first intensity value of a corresponding pixel in the third image exceeds the first threshold, divide the fourth image into a plurality of blocks, individual blocks including a respective subset of pixels of the fourth image, sum the second intensity values of the respective subset of pixels in individual blocks to produce a corresponding plurality of summed values, and identify a region of motion in the second image based on two or more adjacent blocks in the third image having summed values that exceed a second threshold.

Example 19 includes the security sensor of Example 18, wherein to identify the region of motion, the data storage device further stores instructions that when executed by the at least one processor cause the security sensor to produce a bounding box corresponding to the two or more adjacent blocks, and overlay the at least one bounding box on the second image.

Example 20 includes the security sensor of Example 19, wherein to determine the first threshold, the data storage device further stores instructions that when executed by the at least one processor cause the security sensor to assemble a data set corresponding to the third image, the data set identifying the first intensity values and a number of pixels in the third image having each first intensity value, calculate a mean of the data set and a standard deviation for the data set, and determine the first threshold based on the mean and the standard deviation.

Example 21 includes the security sensor of Example 20, wherein the data storage device further stores instructions that when executed by the at least one processor cause the security sensor to determine the first threshold based on a sum of the mean multiplied by a first constant and the standard deviation multiplied by a second constant, wherein the first and second constants are empirically determined constants.

Example 22 includes the security sensor of any one of Examples 18-21, wherein the second intensity value of each pixel in the fourth image is one of zero based on the first intensity value of the corresponding pixel in the third image being at or below the first threshold, or the first intensity value of the corresponding pixel in the third image based on the first intensity value of the corresponding pixel in the third image exceeding the first threshold.

Example 23 includes the security sensor of any one of Examples 18-22, wherein the second threshold is higher than the first threshold.

Example 24 includes the security sensor of any one of Examples 18-23, further comprising a motion detector configured to detect a motion event in the scene.

Example 25 includes the security sensor of Example 24, wherein the motion detector is a passive infrared sensor.

Example 26 includes the security sensor of one of Examples 24 and 25, wherein the data storage device further stores instructions that when executed by the at least one processor cause the security sensor to, based on detection of the motion event with the motion detector, activate the image capture device to acquire the first and second images.

Example 27 includes the security sensor of any one of Examples 24-26, further comprising a battery coupled to the motion detector, the image capture device, the data storage device, and the at least one processor.

As will be appreciated in light of this disclosure, modifications are possible in the described embodiments, and other embodiments are possible, within the scope of the claims.

The invention claimed is:

1. A method comprising:
producing a first image based on a plurality of previous images that form part of a sequence of images, the first image including pixels with intensity values that approximate a difference in intensity values between a pair of pixels within the previous images, and the pair of pixels being one pixel from each of first and second previous images and present at the same locations within their respective images;
generating a second image by applying a threshold to the first image, the second image including one or more pixels with intensity values above the threshold, and the threshold being derived from intensity values of pixels within the first image and a number of pixels in the first image with a respective intensity value; and
determining a region of the second image indicative of motion based on a location of the one or more pixels in the second image.

2. The method of claim 1, further comprising acquiring the plurality of previous images using a camera.

3. The method of claim 2, further comprising:
detecting a motion event in a scene using a motion detector; and
based on detecting the motion event, activating the camera to acquire the plurality of previous images.

4. The method of claim 1, further comprising determining the first threshold by:
assembling a data set corresponding to the first image, the data set specifying the intensity values of the pixels within the first image and the number of pixels in the first image with the respective intensity value;
calculating a mean of the data set and a standard deviation for the data set; and
determining the threshold based on the mean and the standard deviation.

5. A method of motion detection comprising:
acquiring first and second images of a scene using an image capture device;
producing a third image based on the first and second images, wherein a first intensity value of individual pixels in the third image corresponds to a magnitude of a difference in intensity between respective corresponding pixels in the first and second images;
determining a first threshold based on the third image, the first threshold being derived from first intensity values of pixels within the first image and a number of pixels in the first image with a respective first intensity value;
applying the first threshold to the third image to produce a fourth image, wherein each pixel in the fourth image has a respective second intensity value, and wherein the second intensity value is determined based on whether or not the first intensity value of a corresponding pixel in the third image exceeds the first threshold; and
identifying a region of motion based on the second intensity values of the pixels in the fourth image.

6. The method of claim 5, wherein identifying the region of motion comprises:
grouping pixels of the fourth image into a plurality of blocks, individual blocks including a plurality of the pixels of the fourth image;
summing the second intensity values of the plurality of the pixels in individual blocks to produce a summed value for the respective block; and
identifying the region of motion in the second image based on two or more adjacent blocks in the fourth image having summed values that exceed a second threshold.

7. The method of claim 6, wherein identifying the region of motion in the second image comprises:
forming a connected region in the fourth image, the connected region including the two or more adjacent blocks;
producing a bounding box based at least in part on an outline of the connected region; and
overlaying the at least one bounding box on the second image.

8. The method of claim 5, wherein determining the first threshold comprises:
assembling a data set corresponding to the third image, the data set identifying the first intensity values and a number of pixels in the third image having each first intensity value;
calculating a mean of the data set and a standard deviation for the data set; and
determining the first threshold based on the mean and the standard deviation.

9. The method of claim 8, wherein determining the first threshold includes determining the first threshold based on a sum of the mean multiplied by a first constant and the standard deviation multiplied by a second constant, wherein the first and second constants are empirically determined constants.

10. The method of claim 5, wherein the second intensity value of each pixel in the fourth image is one of:
zero based on the first intensity value of the corresponding pixel in the third image being at or below the first threshold; or
the first intensity value of the corresponding pixel in the third image based on the first intensity value of the corresponding pixel in the third image exceeding the first threshold.

11. The method of claim 5, further comprising:
detecting a motion event in a scene using a motion detector; and
based on detecting the motion event, activating the image capture device to acquire the first and second images.

12. The method of claim 5, further comprising:
prior to producing the third image, converting the first and second images to first and second greyscale images, respectively;
wherein producing the third image includes producing the third image based on the first and second greyscale images.

13. A security sensor comprising:
an image capture device;
at least one processor; and
a data storage device storing instructions that when executed by the at least one processor cause the security sensor to
acquire first and second images using the image capture device,
determine differences in pixel intensities between the first and second images,
based on the differences, produce a third image, wherein a first intensity value of individual pixels in the third image corresponds to a magnitude of a difference in intensity between respective corresponding pixels in the first and second images,
determine a first threshold based on the third image, produce a fourth image based on the first threshold, wherein each pixel in the fourth image has a respective second intensity value determined based on whether or not the first intensity value of a corresponding pixel in the third image exceeds the first threshold, and identify a motion event based on the second intensity values of the pixels in the fourth image.

14. The security sensor of claim 13, wherein to identify the motion event, the data storage device further stores instructions that when executed by the at least one processor cause the security sensor to divide the fourth image into a plurality of blocks, individual blocks including a respective subset of pixels of the fourth image, sum the second intensity values of the respective subset of pixels in individual blocks to produce a corresponding plurality of summed values, and identify a region of motion in the second image based on two or more adjacent blocks in the third image having summed values that exceed a second threshold.

15. The security sensor of claim 14, wherein the second threshold is higher than the first threshold.

16. The security sensor of claim 14, wherein to identify the region of motion, the data storage device further stores instructions that when executed by the at least one processor cause the security sensor to produce a bounding box corresponding to the two or more adjacent blocks; and overlay the at least one bounding box on the second image.

17. The security sensor of claim 13, wherein to determine the first threshold, the data storage device further stores instructions that when executed by the at least one processor cause the security sensor to assemble a data set corresponding to the third image, the data set identifying the first intensity value and a number of pixels in the third image having each first intensity value;

calculate a mean of the data set and a standard deviation for the data set; and determine the first threshold based on the mean and the standard deviation.

18. The security sensor of claim 17, wherein the data storage device further stores instructions that when executed by the at least one processor cause the security sensor to:

determine the first threshold based on a sum of the mean multiplied by a first constant and the standard deviation multiplied by a second constant, wherein the first and second constants are empirically determined constants.

19. The security sensor of claim 13, wherein the second intensity value of each pixel in the fourth image is one of:

zero based on the first intensity value of the corresponding pixel in the third image being at or below the first threshold; or the first intensity value of the corresponding pixel in the third image based on the first intensity value of the corresponding pixel in the third image exceeding the first threshold.

20. The security sensor of claim 13, further comprising:

a motion detector configured to detect a motion event;

wherein the data storage device further stores instructions that when executed by the at least one processor cause the security sensor to, based on detection of the motion event with the motion detector, activate the image capture device to acquire the first and second images.

21. The security sensor of claim 20, further comprising:

a battery coupled to the motion detector, the image capture device, the data storage device, and the at least one processor.

* * * * *

UNITED STATES PATENT AND TRADEMARK OFFICE
CERTIFICATE OF CORRECTION

| | |
|---|---|
| PATENT NO. | : 12,169,940 B2 |
| APPLICATION NO. | : 18/423726 |
| DATED | : December 17, 2024 |
| INVENTOR(S) | : Monica Xu, Shekhar Bangalore Sastry and Nicholas Setzer |

It is certified that error appears in the above-identified patent and that said Letters Patent is hereby corrected as shown below:

In the Claims

In Claim 4, Column 37, Line 29, "the first threshold by:" should read "the threshold by:".

Signed and Sealed this
Twenty-seventh Day of May, 2025

Coke Morgan Stewart
*Acting Director of the United States Patent and Trademark Office*